United States Patent
Wiehe et al.

(10) Patent No.: US 11,425,553 B2
(45) Date of Patent: Aug. 23, 2022

(54) OPTIMIZED MOBILITY MANAGEMENT SIGNALING IN A DATA CENTRIC NETWORK ARCHITECTURE

(71) Applicant: NOKIA SOLUTIONS AND NETWORKS, Espoo (FI)

(72) Inventors: Ulrich Wiehe, Bad Hersfeld (DE); Bruno Landais, Pleumeur-Bodou (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/314,576

(22) PCT Filed: Jun. 29, 2017

(86) PCT No.: PCT/EP2017/066090
§ 371 (c)(1),
(2) Date: Dec. 31, 2018

(87) PCT Pub. No.: WO2018/002197
PCT Pub. Date: Jan. 4, 2018

(65) Prior Publication Data
US 2019/0208401 A1    Jul. 4, 2019

Related U.S. Application Data

(60) Provisional application No. 62/357,582, filed on Jul. 1, 2016.

(51) Int. Cl.
*H04W 8/08* (2009.01)
*H04W 8/02* (2009.01)
(Continued)

(52) U.S. Cl.
CPC .............. *H04W 8/08* (2013.01); *H04W 8/02* (2013.01); *H04W 8/04* (2013.01); *H04W 8/24* (2013.01);
(Continued)

(58) Field of Classification Search
CPC .......... H04W 8/08; H04W 8/02; H04W 8/04; H04W 8/24; H04W 80/10; H04W 84/042
See application file for complete search history.

(56) References Cited

U.S. PATENT DOCUMENTS

| | | | |
|---|---|---|---|
| 7,209,758 B1 * | 4/2007 | Moll ................. | G01S 5/0009 455/456.3 |
| 2009/0305668 A1 * | 12/2009 | Ahn .................. | H04W 12/06 455/410 |
| 2013/0272131 A1 * | 10/2013 | Takano ............. | H04W 28/0247 370/235 |

FOREIGN PATENT DOCUMENTS

WO    WO-2007051407 A1 *    5/2007    ............ H04W 60/00

OTHER PUBLICATIONS

International Search Report and Written Opinion dated Oct. 24, 2017, corresponding to International Application No. PCT/EP2017/066090.

(Continued)

*Primary Examiner* — Zhensheng Zhang
(74) *Attorney, Agent, or Firm* — Squire Patton Boggs (US) LLP

(57) ABSTRACT

Systems, methods, apparatuses, and computer program products for optimized mobility management signaling in, for example, a data-centric network architecture are provided. One method may include storing data in at least one database of a shared data layer, such that the data stored in the shared data layer is shared by a plurality of network entities.

10 Claims, 24 Drawing Sheets

(51) Int. Cl.
   *H04W 8/04*    (2009.01)
   *H04W 8/24*    (2009.01)
   *H04W 80/10*   (2009.01)
   *H04W 84/04*   (2009.01)
(52) U.S. Cl.
   CPC .......... *H04W 80/10* (2013.01); *H04W 84/042* (2013.01)

(56) References Cited

OTHER PUBLICATIONS

ETSI TS 123 335 V13.1.0 (Release 13), "Digital cellular telecommunications system (Phase 2+) (GSM); Universal Mobile Telecommunications System (UMTS); LTE; User Data Convergence (UDC); Technical realization and information flows; Stage 2", Technical Specification, European Telecommunications Standards Institute (ETSI), Apr. 1, 2016, XP014274222, 43 pages.

Nokia Siemens Networks: "Dynamics Load Balancing", 3GPP Draft; C4-130450 PCR 29.809_V0.1.0 Load Balancing, 3rd Generation Partnership Project (3GPP), Mobile Competence Centre; vol. CT WG4, San Diego; Apr. 9-11, 2013, Retrieved from the Internet: URL:http://www.3gpp.org/ftp/tsg_ct/WG4_protocollars_ex-CN4/TSGCT4_60ad_hoc_San_Diego/Docs/, XP050695222, 6 pages.

3GPP TR 22.985 V11.0.0 (Sep. 2012); 3rd Generation Partnership Project; Technical Specification Group Services and System Aspects; Service requirements for the User Data Convergence (UDS) (Release 11), Sep. 21, 2012, XP051292618, 16 pages.

\* cited by examiner

OPTIMIZED MOBILITY MANAGEMENT SIGNALING IN A DATA CENTRIC NETWORK ARCHITECTURE

CROSS-REFERENCE TO RELATED APPLICATIONS

This application claims priority from U.S. Provisional Application No. 62/357,582, filed on Jul. 1, 2016. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), and/or 5G radio access technology. Some embodiments may generally relate to optimizing mobility management signaling.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method that may include storing data in at least one database of a shared data layer, such that the data stored in the shared data layer is shared by a plurality of network entities.

In an embodiment, the data may include at least one of user subscription data or session data. According to one embodiment, the network entities may include one or more mobility management entities, mobility and session management entities, service capability exposure functions, or gateways.

In an embodiment, the method may further include, in a roaming or non-roaming scenario, downloading by a mobility management entity of a visited public land mobile network, the user subscription data from a home subscription server. In a further embodiment, the method may also include storing the downloaded user subscription data in the shared data layer of the visited public land mobile network.

According to an embodiment, the user subscription data stored in the shared data layer may be shared with other entities in the visited public land mobile network. In one embodiment, the user subscription data may be shared with the other entities in the visited public land mobile network when a user equipment moves under a control of a new mobility management entity.

In another embodiment, the method may also include checking whether the user subscription data or session data is available in the shared data layer of the visited public land mobile network, and at least one of, when the user subscription data is available in the shared data layer of the visited public land mobile network, skipping part of or all of the intra- or inter-public land mobile network signaling between the network entities and the home subscription server and/or when the session data is available in the shared data layer of the visited public land mobile network, skipping part of or all of the intra- or inter-public land mobile network signaling between the network entities. According to one embodiment, the inter- or intra-public land mobile network signaling between the network entities and the home subscription server may include an update location request.

Another embodiment is directed to an apparatus including storing means for storing data in at least one database of a shared data layer, such that the data stored in the shared data layer is shared by a plurality of network entities.

In another embodiment, the apparatus may further include, in a roaming or non-roaming scenario, downloading means for downloading by a mobility management entity of a visited public land mobile network, the user subscription data from a home subscription server. In a further embodiment, the apparatus may also include means for storing the downloaded user subscription data in the shared data layer of the visited public land mobile network.

In another embodiment, the apparatus may also include checking means for checking whether the user subscription data or session data is available in the shared data layer of the visited public land mobile network, and at least one of, when the user subscription data is available in the shared data layer of the visited public land mobile network, skipping means for skipping part of or all of inter- or intra-public land mobile network signaling between the network entities and the home subscription server and/or when the session data is available in the shared data layer of the visited public land mobile network, skipping means for skipping part or all of the intra- or inter-public land mobile network signaling between the network entities. According to one embodiment, the inter- or intra-public land mobile network signaling between the network entities and the home subscription server may include an update location request.

Another embodiment is directed to an apparatus that may include at least one processor and at least one memory including computer program code. The at least one memory and the computer program code are configured, with the at least one processor, to cause the apparatus at least to store data in at least one database of a shared data layer, such that the data stored in the shared data layer is shared by a plurality of network entities.

Another embodiment is directed to a computer program, embodied on a non-transitory computer readable medium. The computer program may be configured to control a processor to perform a process that may include storing means for storing data in at least one database of a shared data layer, such that the data stored in the shared data layer is shared by a plurality of network entities.

BRIEF DESCRIPTION OF THE DRAWINGS

For proper understanding of the invention, reference should be made to the accompanying drawings, wherein.

DETAILED DESCRIPTION

Figure 1:
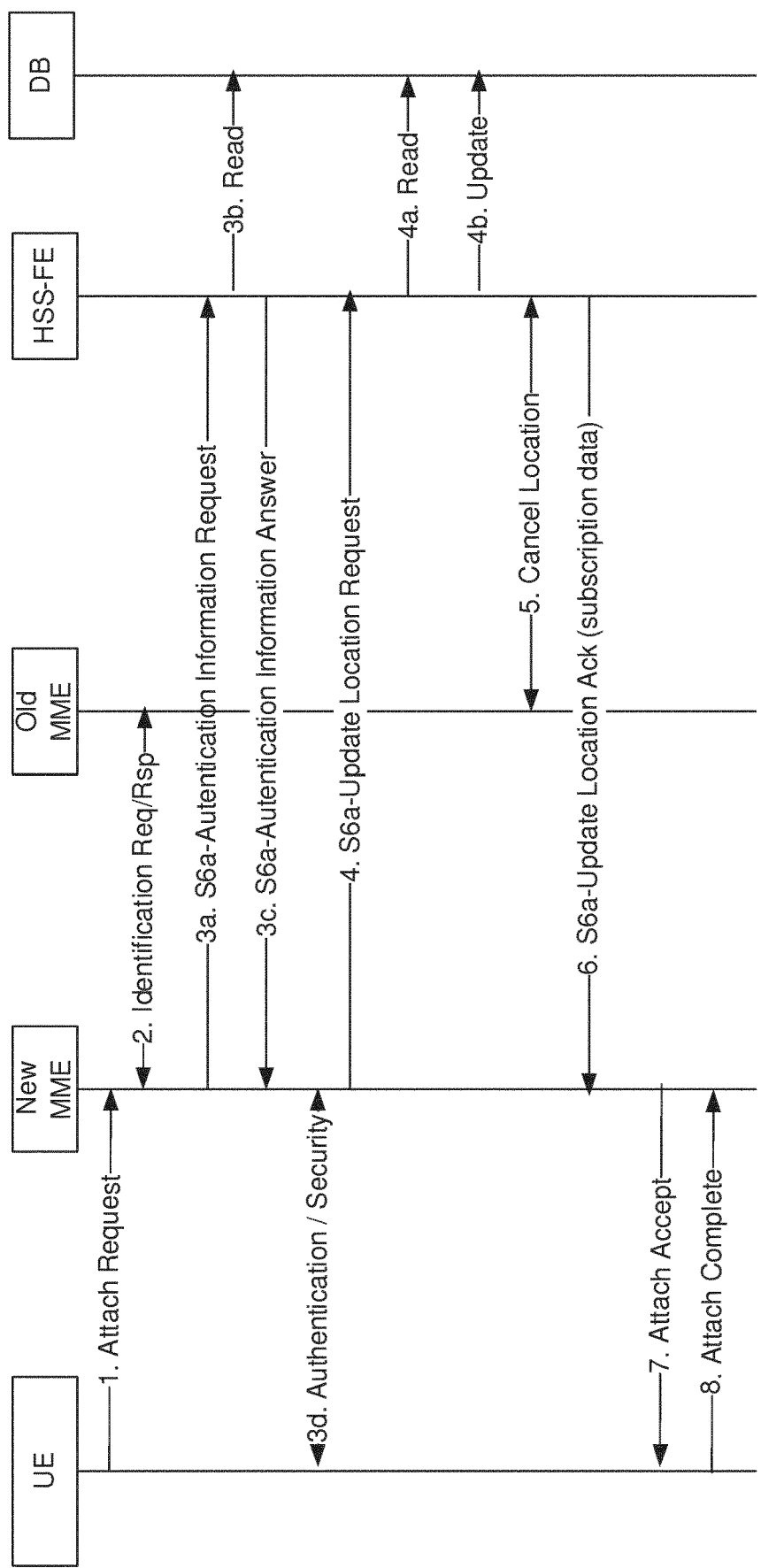
FIG. 1 illustrates a signaling diagram depicting an E-UTRAN Attach scenario.

It will be readily understood that the components of the invention, as generally described and illustrated in the figures herein, may be arranged and designed in a wide variety of different configurations. Thus, the following detailed description of embodiments of systems, methods, apparatuses, and computer program products for optimized mobility management signaling in, for example, a data-centric network architecture, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Moving towards a data centric architecture, with data sharing between Mobility Management Entities (MMEs) and/or with the Home Subscription Server (HSS), facilitates the optimizing of the mobility management signalling flows and drastically reducing the network signalling and complexity. All the intra-public land mobile network (PLMN) signalling between a MME and HSS can be removed in non-roaming scenarios. It is expected that the 5G system architecture will evolve towards such an architecture. The terms MME and MSM, as used thoughout this disclosure, may refer to any Core Control Function supporting Mobility Management in a mobile network, e.g., to the 5G Core Control Function supporting Mobility Management. The terms MME and MSM can be used interchangeably, according to certain embodiments.

Existing PLMNs (legacy evolved packet core (EPC)) are designed as a messaging-based architecture, i.e., without data sharing across network entities, and thus with extensive signalling across all network entities. Certain embodiments of the invention provide a data centric architecture that allows extensive signalling savings, in all mobility scenarios and beyond, between the Mobility Management Entities and between the MME and the HSS.

As introduced above, existing PLMNs have a messaging-based architecture without data sharing across network entities. This results in extensive signalling across all network entities and, in particular (but not only), during mobility scenarios (such as attach, tracking area update, handover).

A UE's mobility causes significant signaling in PLMNs, for example between Mobility Management Entities (e.g., to transfer the UE context, packet data network (PDN) connections and bearers contexts during idle or connected mode mobility) or between Mobility Management Entities and the HSS (e.g., to register the new serving node in the HSS and/or to download the subscription data to the new serving node).

It is desirable to move away from the legacy messaging-based design, towards a cloud optimized network architecture, for example, in order to reduce the network signaling and complexity. 3GPP SA2 is currently working on the definition of the 5G system architecture, which provides a unique opportunity to move towards a data centric architecture with optimized network signaling flows.

The Shared Data Layer (SDL) provides a data centric network architecture, whereby the data can be shared by network entities, such as between multiple Mobility Management Entities (MMEs), or between MME and other entities such as the HSS, service capability exposure function (e.g., SCEF), gateway (GW), Policy Function (e.g., PCRF). This allows for embodiments of the invention to provide optimized mobility management signaling flows and to drastically reduce the network signaling and complexity. Certain embodiments also include, for the non-roaming case, the removal of all intra-PLMN signaling between the Mobility Management Entities and the HSS in all scenarios between the MME and HSS (e.g., authentication, purge, reset, user profile updates etc.).

According to further embodiments, in roaming scenarios, the Mobility Management Entity of the visited PLMN may download the user subscription data from the HSS, and store them in the Shared Data Layer of the visited PLMN, for use or sharing with other entities in the VPLMN, e.g., when the UE subsequently moves under the control of a different Mobility Management Entity.

Figure 2:
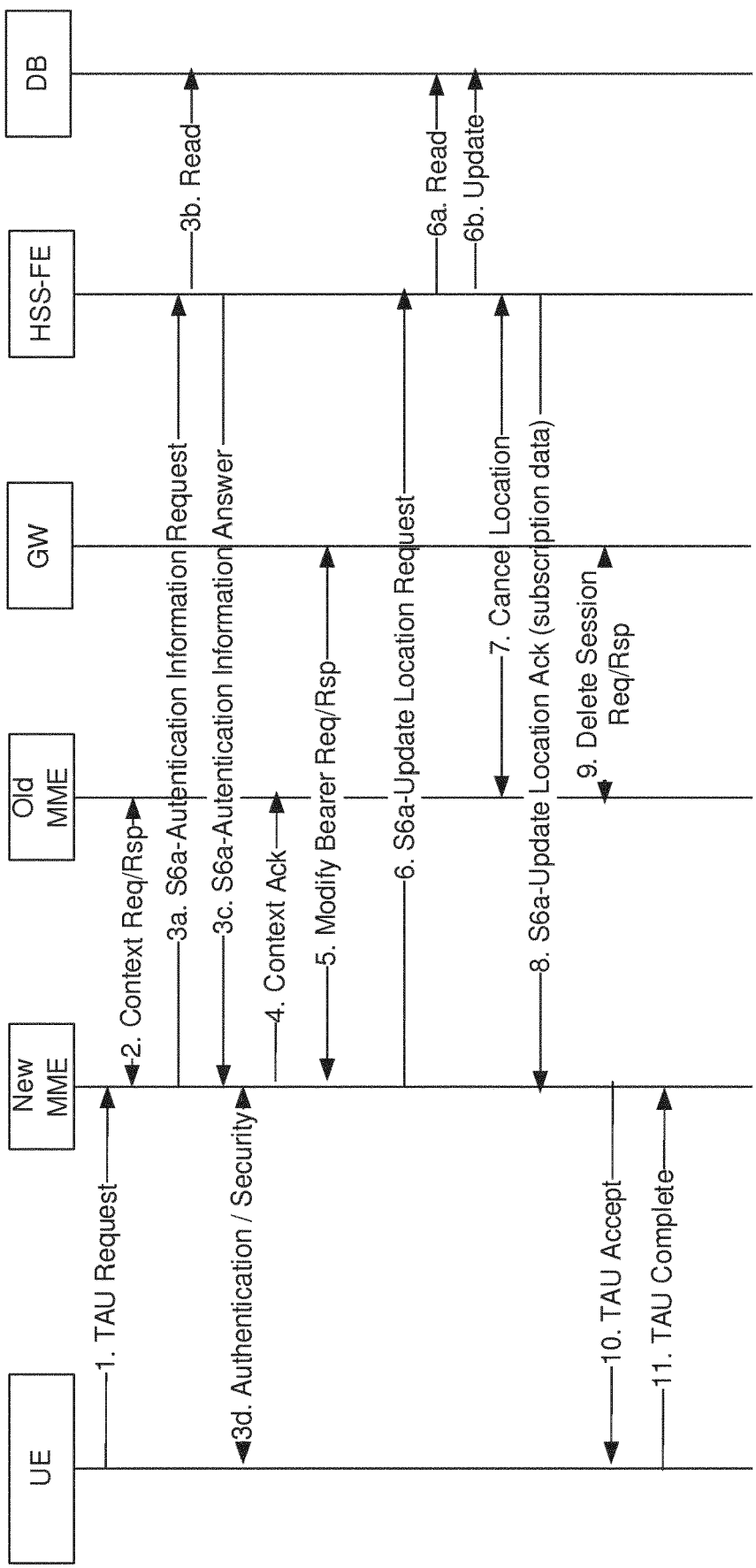
FIG. 2 illustrates a signaling diagram depicting a TAU scenario.
Figure 3:
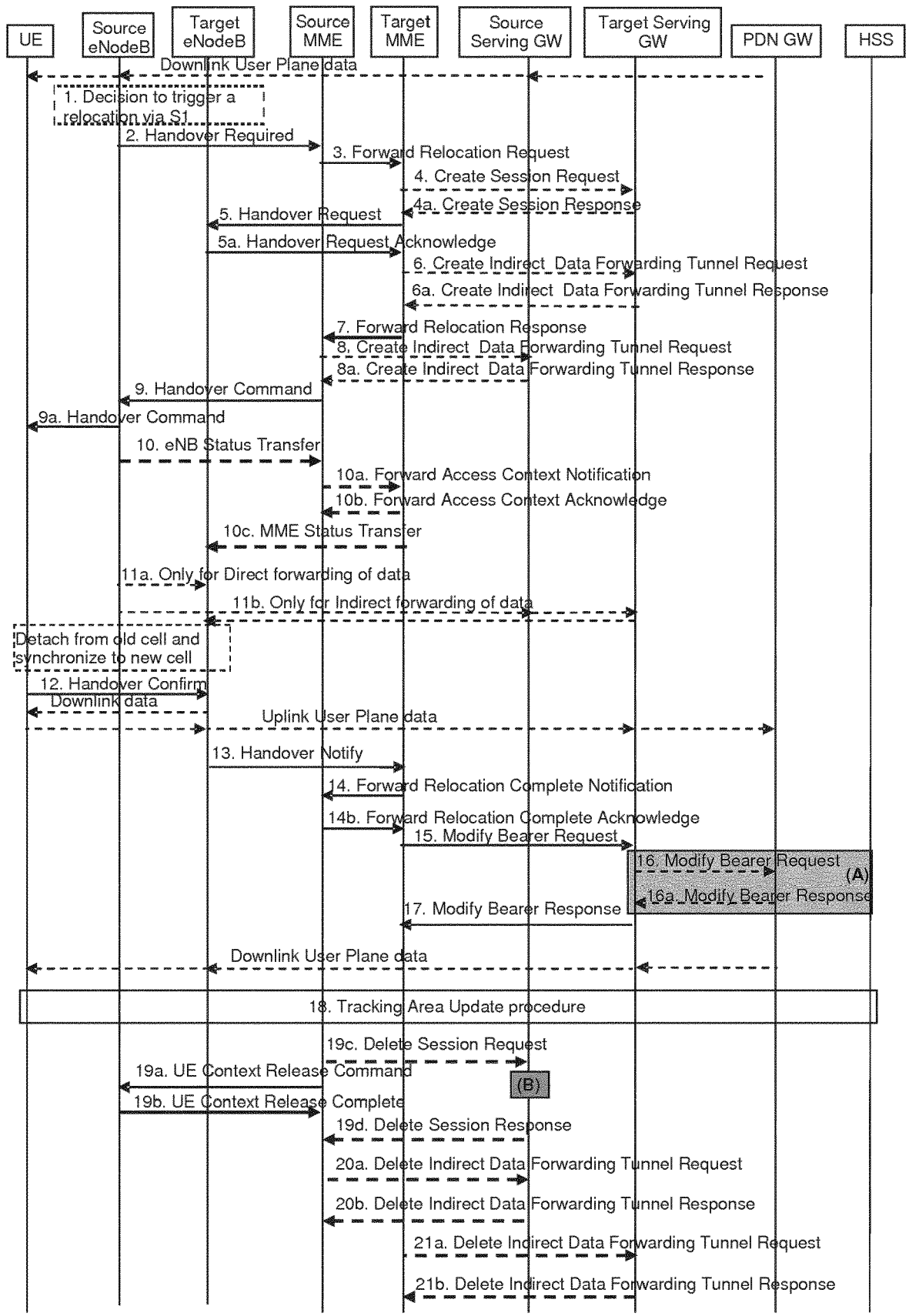
FIG. 3 illustrates a signaling diagram depicting an Inter MME Handover scenario.

FIGS. 1, 2 and 3 depict the existing Attach, TAU (Tracking Area Update) and Handover scenarios in a legacy EPC network (e.g., for 2G/3G/4G). In particular, FIG. 1 illustrates a signaling diagram depicting an E-UTRAN Attach scenario (legacy EPC). As depicted in FIG. 1, at 1, the UE sends an Attach request to any MME in the MME pool to register to the network. At 2, the new MME optionally retrieves UE info (e.g., user identity, unused authentication vectors) from the old MME. At 3, the MME may request new authentication vectors and UE Usage Type (for Dedicated CN selection) to the HSS/AuC. Authentication and Security procedures are performed between the UE and new MME. At 4, the new MME registers the UE to the HSS and, at 5, the MME cancels the previous UE registration in the old MME. At 6, the HSS downloads the user subscription's profile to the new MME and, at 7, the MME accepts the Attach request.

FIG. 2 illustrates a signaling diagram depicting a TAU scenario (legacy EPC). As illustrated in FIG. 2, at 1, the UE sends a TAU request to a new MME to register to the network. At 2, the new MME retrieves UE info (e.g., user identity, unused authentication vectors), including information about the UE's PDN connections and bearers contexts from the old MME. At 3, the MME may request new authentication vectors and UE Usage Type (for Dedicated CN selection) from the HSS/AuC. Authentication and Security procedures are performed between the UE and new MME. At 5, the new MME takes the control of the UE context in SGW and, at 6, the new MME registers the UE to the HSS. At 7, the HSS cancels the previous UE registration in the old MME and, at 8, the HSS downloads the user subscription's profile to the new MME. At 10, the MME accepts the TAU request.

FIG. 3 illustrates a signaling diagram depicting an Inter MME Handover scenario (legacy EPC). As illustrated in FIG. 3, at 3, the old MME sends a Forward Relocation Request to the new MME, including UE context information (e.g., unused authentication vectors) and information about all the UE's PDN connections and bearers contexts. At 18, the new MME registers the UE in the HSS and downloads the user subscription's profile from the HSS.

As shown in FIGS. 1-3, in these signaling call flow diagrams, extensive signaling takes place between: the new and the old MMEs, to transfer UE context information (e.g. unused authentication data, UE's capabilities, etc) and/or all the UE's PDN connections and bearers contexts; the new MME and the HSS, to register the new serving node in the HSS and/or to download the subscription data to the new serving node; and the HSS and the old MME, to cancel the UE's registration in the old MME.

The Shared Data Layer provides a data centric network architecture, whereby the data (user subscription, session data, etc.) can be shared by network entities, such as by multiple Mobility and Session Management (MSM) entities and/or other entities such as the HSS, SCEF, GW, Policy Function and Simplified Stateless virtual network functions (VNFs).

Figure 4:
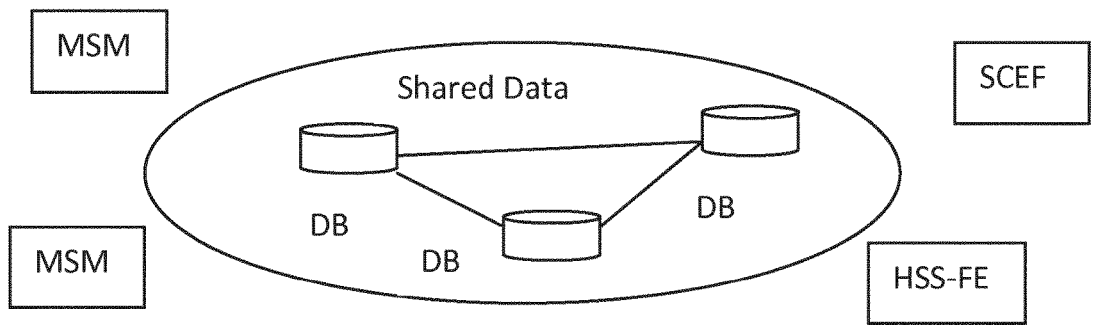
FIG. 4 illustrates an example system diagram depicting a data centric network architecture with a Shared Data Layer, according to one embodiment.

FIG. 4 illustrates an example diagram depicting a data centric network architecture with a Shared Data Layer, according to one embodiment. In an embodiment, the data may be shared, in particular, by different MSM entities (in roaming and non-roaming scenarios), or between the MSM entities and the HSS (in non-roaming scenarios). As a result, certain embodiments allow for the design of optimized mobility management signaling flows and for drastically reducing the network signaling and complexity. Some embodiments also allow for removal of all intra PLMN signaling between the MSM entities and the HSS in non-roaming scenarios, and in all legacy Sha signaling scenarios between the MME and HSS (e.g., authentication, purge, reset, user profile updates etc).

The Shared Data Layer can be regarded as an extension of the UDC (User Data Convergence) architecture specified in 3GPP (see, e.g., 3GPP TS 23.335 and 29.335), with any application (e.g., stateless VNFs) being able to access and share data between each other.

Figure 5:
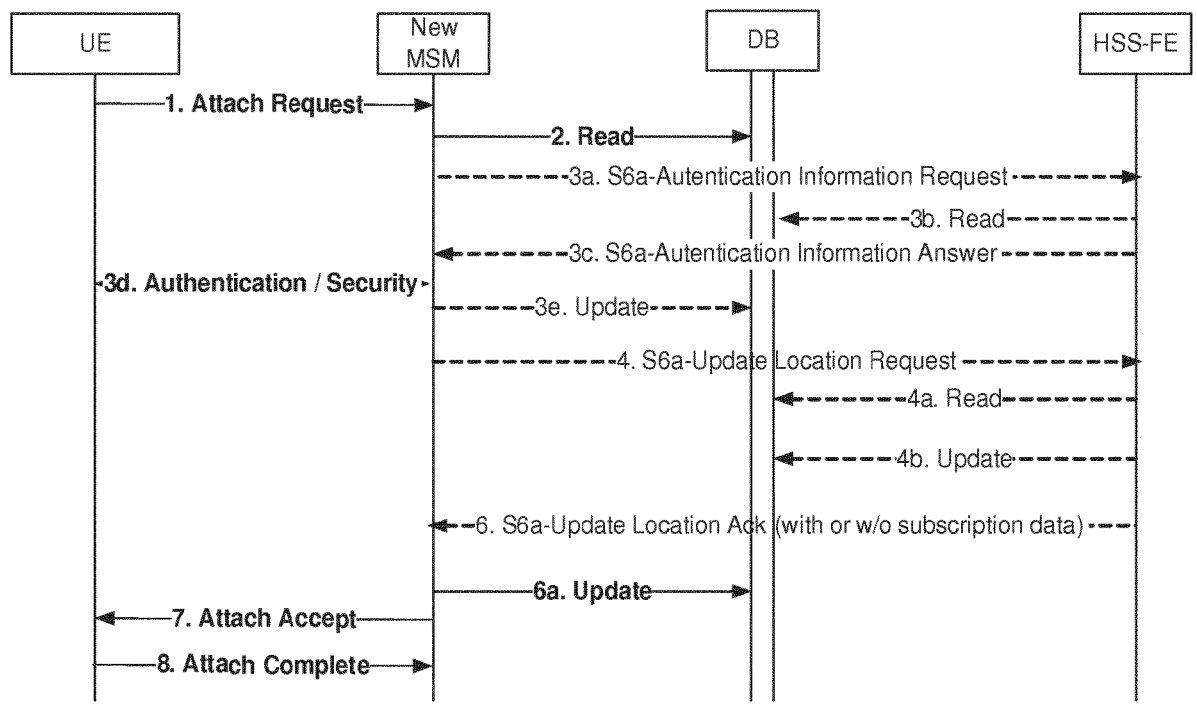
FIG. 5 illustrates a signaling diagram depicting an attach scenario, with Data Sharing between the MSM entities, according to one embodiment.

FIGS. 5, 6 and 7 and 8 illustrate the optimized signaling flows enabled by sharing data between the MSM entities in the PLMN, according to an embodiment. FIG. 5 illustrates a signaling diagram depicting an attach scenario, with Data Sharing between the MSM entities, according to one embodiment. In this embodiment, the new MSM and the old MSM may access the same database (DB). In another embodiment, data in the MSM and HSS DB may be separated. As illustrated in FIG. 5, at 2, the new MSM checks whether the UE context (subscription data) already exist in the DB (i.e., in the SDL of the visited PLMN). In this example, the UE re-attaches to the same PLMN as it was last registered, so the user data is available and the new MSM gets the user data from the DB. At 4, the Update Location Request (ULR) can be skipped if the user data are already available (which is the case in this example) and the UE remains in the same MSM pool and no network sharing scenario. In non-roaming scenarios, the ULR can also be skipped if UE enters a different MSM pool but the old and the new MSM pools share the data; alternatively, the new MSM may send a ULR to the HSS including an indication that the subscription data are already available and do not need to be downloaded again. At 4a, the HSS-FE (HSS-front end) reads subscription data and perform the ULR checks and updates the DB. Then, at 6a, the new MSM updates data in DB (e.g., new temporary identities, new location area).

Some benefits of Shared Data Layer between MSMs, which can be seen from FIG. 5, may include no signaling between the new and the last MSM serving the UE, no signaling or minimized signaling between the MSMs and the HSS, e.g., no identification Req/Rsp between MSMs, no Cancel Location Req from HSS to old MSM, no more need for signaling to HSS, i.e., steps 4 can be skipped (reAttach in same MSM pool/SDL), and no more need to download subscription data from HSS to new MSM (in scenarios where step 4 would still be required).

Figure 6:
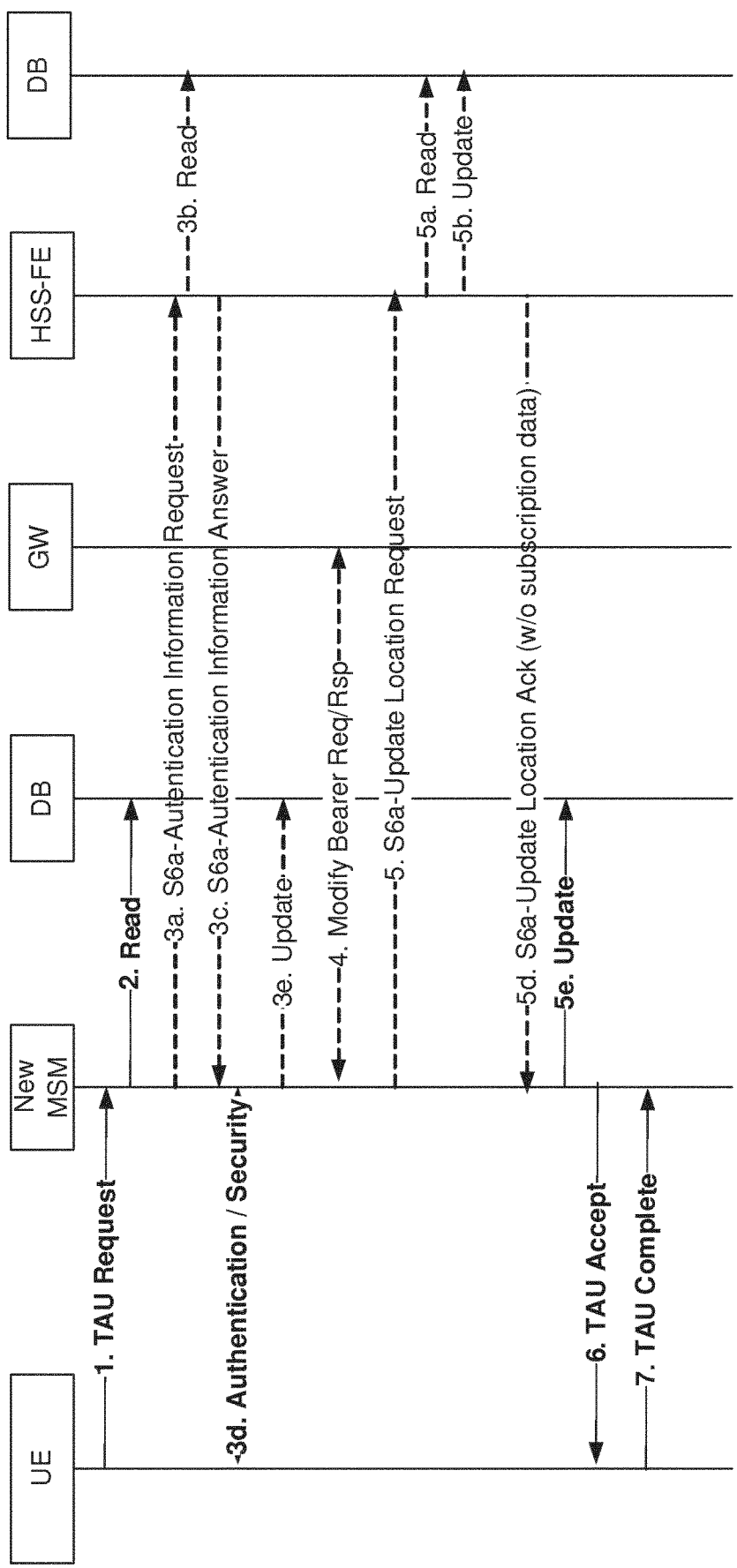
FIG. 6 illustrates a signaling diagram depicting TAU scenario, with Data Sharing between the MSM entities, according to one embodiment.

FIG. 6 illustrates a signaling diagram depicting TAU scenario, with Data Sharing between the MSM entities, according to one embodiment. As illustrated in FIG. 6, at 2, Context Request/Response/Acknowledgement are replaced by a read access to DB (to retrieve UE context). At 4, a Modify Bearer Request/Response from new MSM to GW is no longer needed, unless changes of information elements (IEs) need to be reported to the GW. At 5, the ULR can be skipped if user data are available and UE remains in the same MSM pool and no network sharing scenario. In non-roaming scenarios, the ULR may also be skipped if the UE enters a different MSM pool but the old and the new pools share the data; alternatively, the new MSM may send a ULR to the HSS including an indication that the subscription data are already available and do not need to be downloaded again. At 5e, the new MSM updates the UE context (e.g., new temporary identities, new location area, etc. . . . ).

Some benefits of SDL between MSMs, which can be seen from FIG. 6, may include no signaling between the new and the last MSM serving the UE, no signaling or minimized signaling between the MSMs and the HSS, e.g., no more need of Context Req/Rsp between MSMs (replaced by read access to DB), no more need for Modify Bearer Req/Rsp (unless modified IEs need to be reported), no more need for signaling to HSS, i.e. steps 5 can be skipped (in most scenarios), and no more need to download subscription data from HSS to new MSM (in scenarios where step 5 would still be required).

Figure 7:
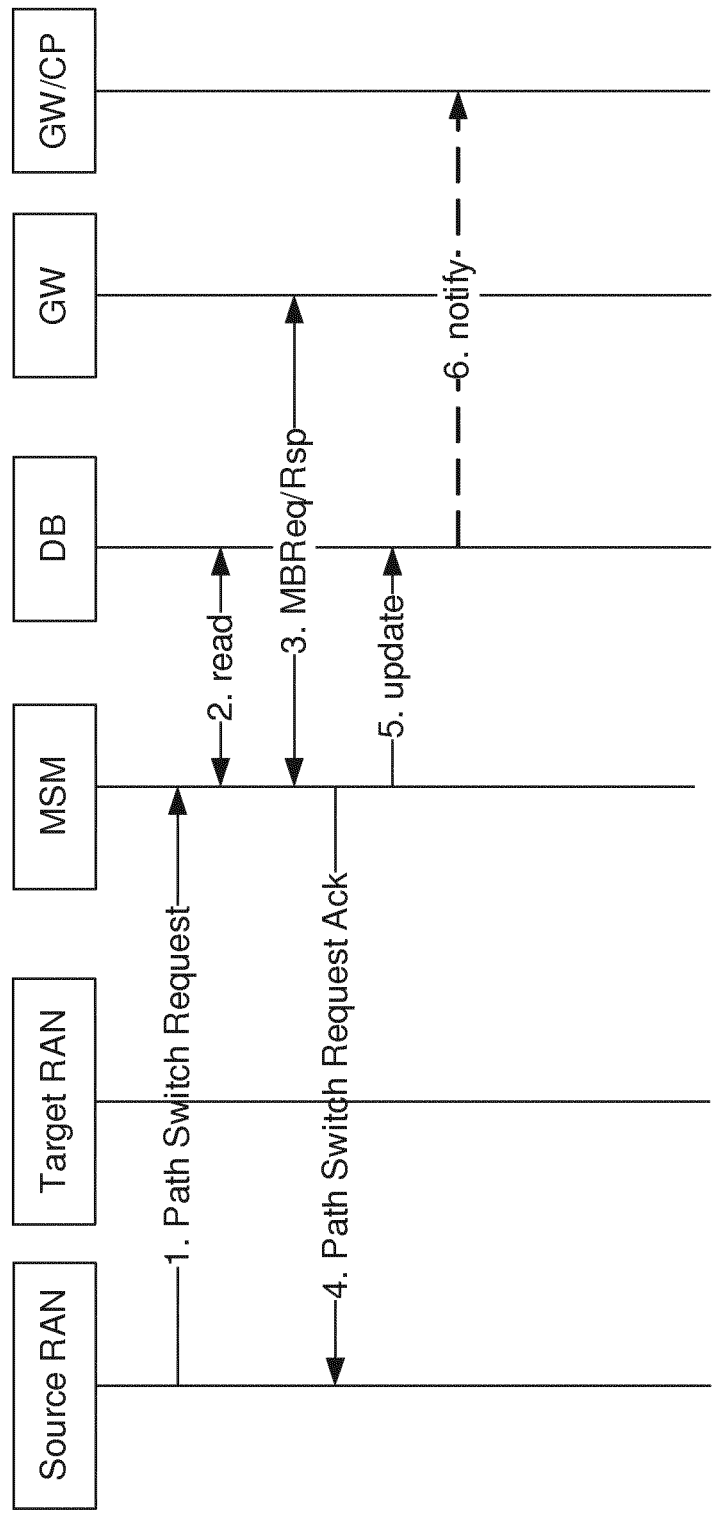
FIG. 7 illustrates a signaling diagram depicting an X2-like handover scenario, with Data Sharing between the MSM entities, according to one embodiment.

FIG. 7 illustrates a signaling diagram depicting an X2-like handover scenario, with Data Sharing between the MSM entities, according to one embodiment. As illustrated in FIG. 7, at 2, MSM fetches UE context (e.g., if MSM can be stateless for UE in connected mode). At 3, MSM requests GW to switch UP to new RAN, and GW returns @ for UL traffic. At 5, MSM updates DB (UP addresses for UL/DL traffic, new cell id) and, at 6, other GW/CP entities may be notified about change of location.

Some benefits of SDL between MSMs, as can be seen from FIG. 7, may include: X2-based HO is ONLY supported in EPC when there is no change of MME. X2 (like)-based HO could be supported, with SDL, in any mobility scenario involving MSMs sharing data.

Figure 8:
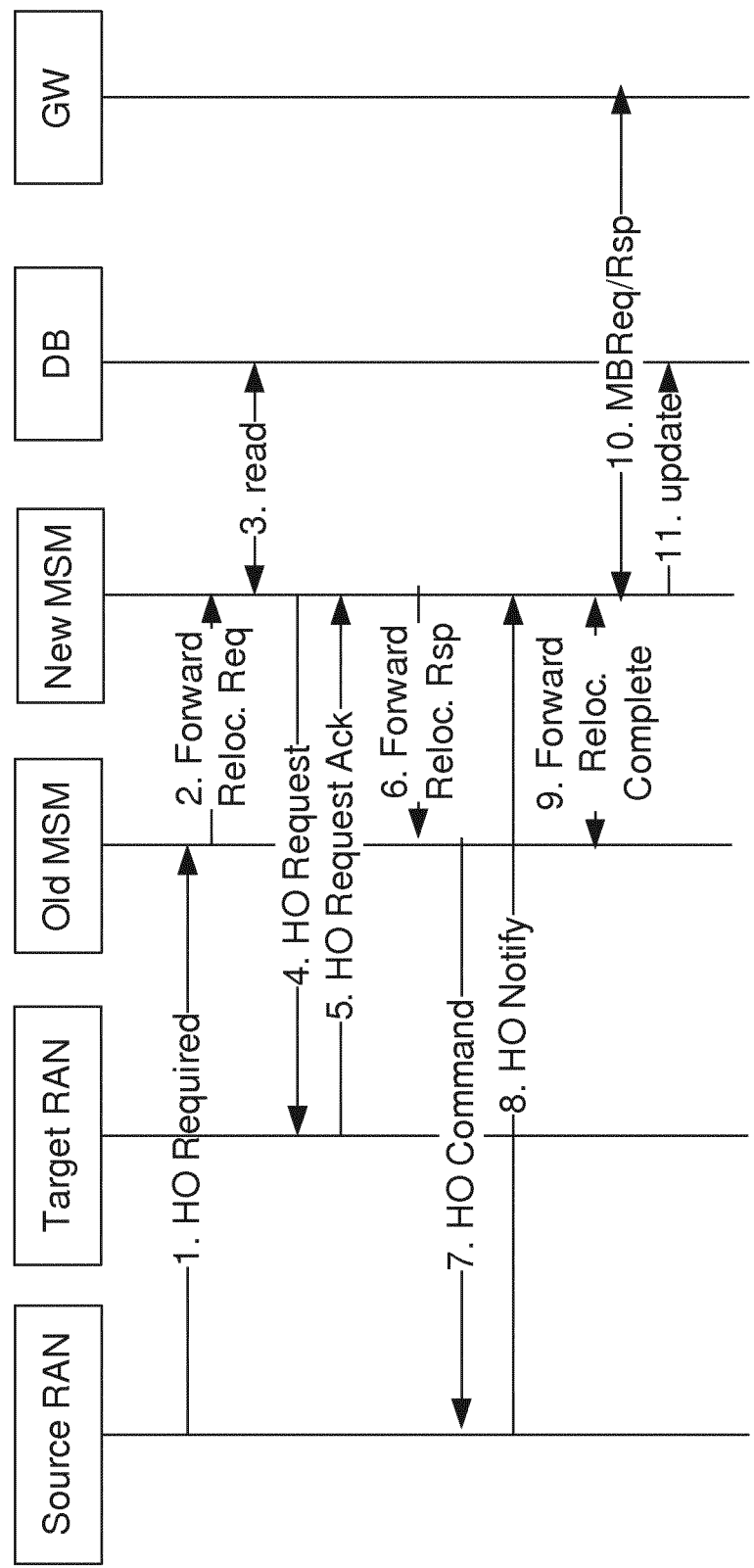
FIG. 8 illustrates a signaling diagram depicting an S1-like handover scenario across MME pools sharing data, with Data Sharing between the MSM entities, according to an embodiment.

FIG. 8 illustrates a signaling diagram depicting an S1-like handover scenario across MME pools sharing data, with Data Sharing between the MSM entities, according to an embodiment. As illustrated in FIG. 8, at 2, the Forward Relocation Request does NOT need to transfer all the PDN/bearer contexts to the target MSM, as in legacy EPC. At 3, the new MSM fetches UE/PDN/bearer contexts from SDL. At 11, the new MSM updates UE context (new location area, etc). No signaling is required to the HSS during the subsequent TAU procedure (see TAU scenario).

Some benefits of SDL between MSMs, as depicted in FIG. 8, may include minimized signaling between the new and the last MSM serving the UE, no or minimized signaling between the MSMs and the HSS, e.g., in step 2, Forward Relocation Request does NOT need to transfer all the PDN/bearer contexts to the target MSM, as in legacy EPC.

The new MSM can fetch the data directly from the SDL. In step 11, there is no signalling to HSS during the subsequent TAU procedure.

Figure 9:
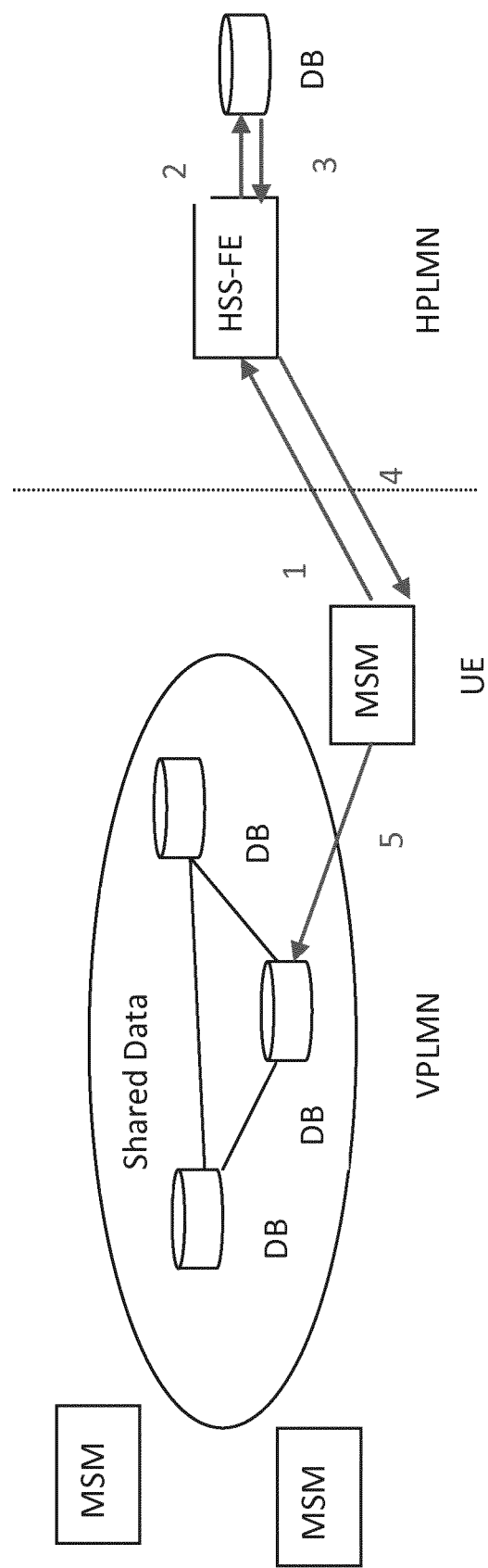
FIG. 9 illustrates a system diagram depicting a roaming scenario with a data centric network architecture, with a Shared Data Layer in the Visited PLMN, according to an embodiment.

FIG. 9 illustrates a block diagram depicting a roaming scenario with a data centric network architecture, with a Shared Data Layer in the Visited PLMN, according to an embodiment. In roaming scenarios, the Mobility Management Entity of the visited PLMN may download the user subscription data from the HSS, and store them in the Shared Data Layer of the visited PLMN, for use/sharing with other entities in the VPLMN, for example when the UE subsequently moves in an area served by a different Mobility Management Entity.

Figure 10:
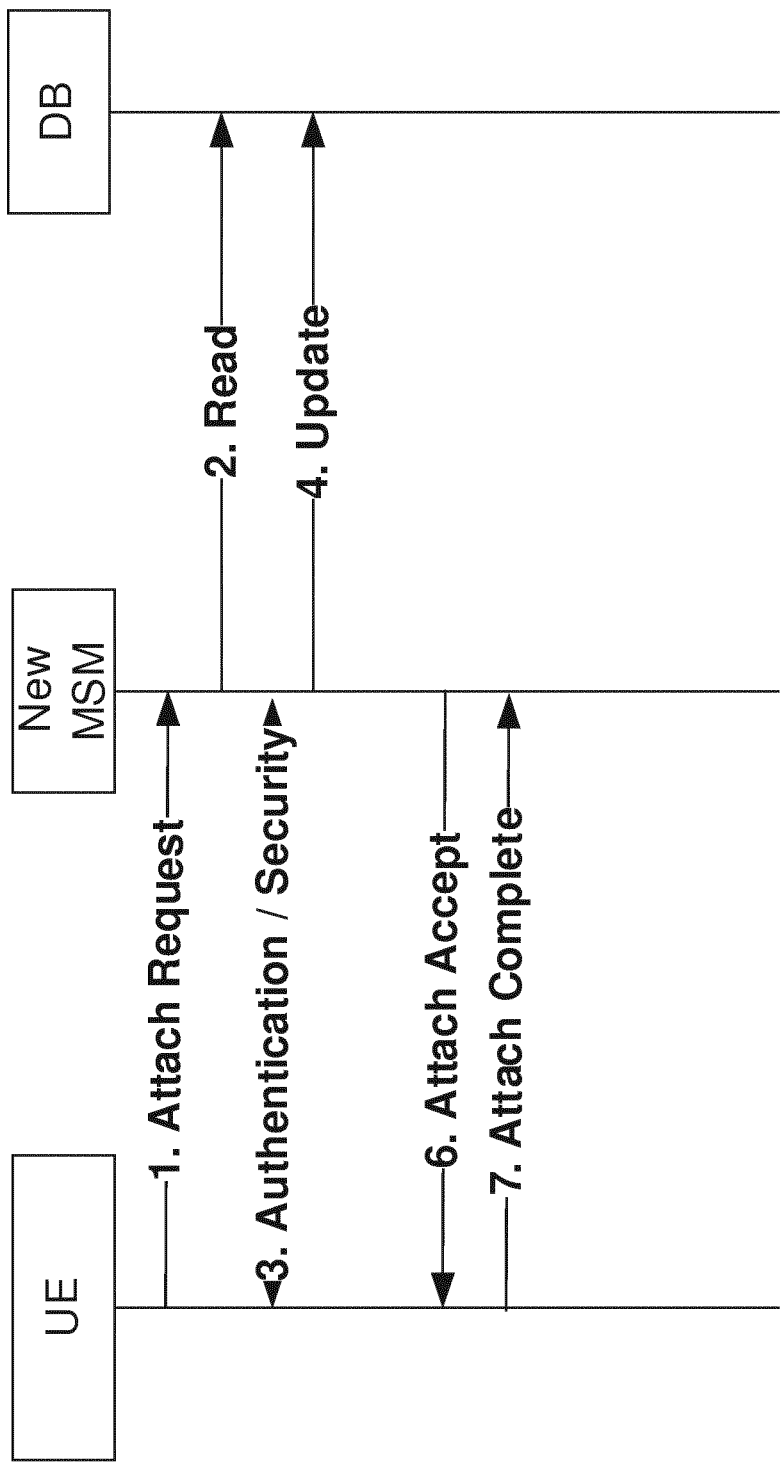
FIG. 10 illustrates a signaling diagram depicting an attach scenario, with Data Sharing between the MSM entity and the HSS, according to an embodiment.

FIG. 10 illustrates a signaling diagram depicting an attach scenario, with Data Sharing between the MSM entity and the HSS, according to an embodiment. In this example, the new MSM, old MSM and HSS may access the same DB (i.e., only applies to non-roaming scenarios). All the MSM signaling to the HSS can be skipped, even during a very first Attach scenario. If the UE was registered in a different SDL or in a Foreign PLMN (FPLMN), a notification may be sent to trigger the Cancel Location Request towards the old MSM.

Some benefits of SDL between MSM and HSS, as depicted in FIG. 10, may include: no signaling to HSS (neither for authentication nor for ULR/download of subscription data), even for a very first Attach scenario.

Figure 11:
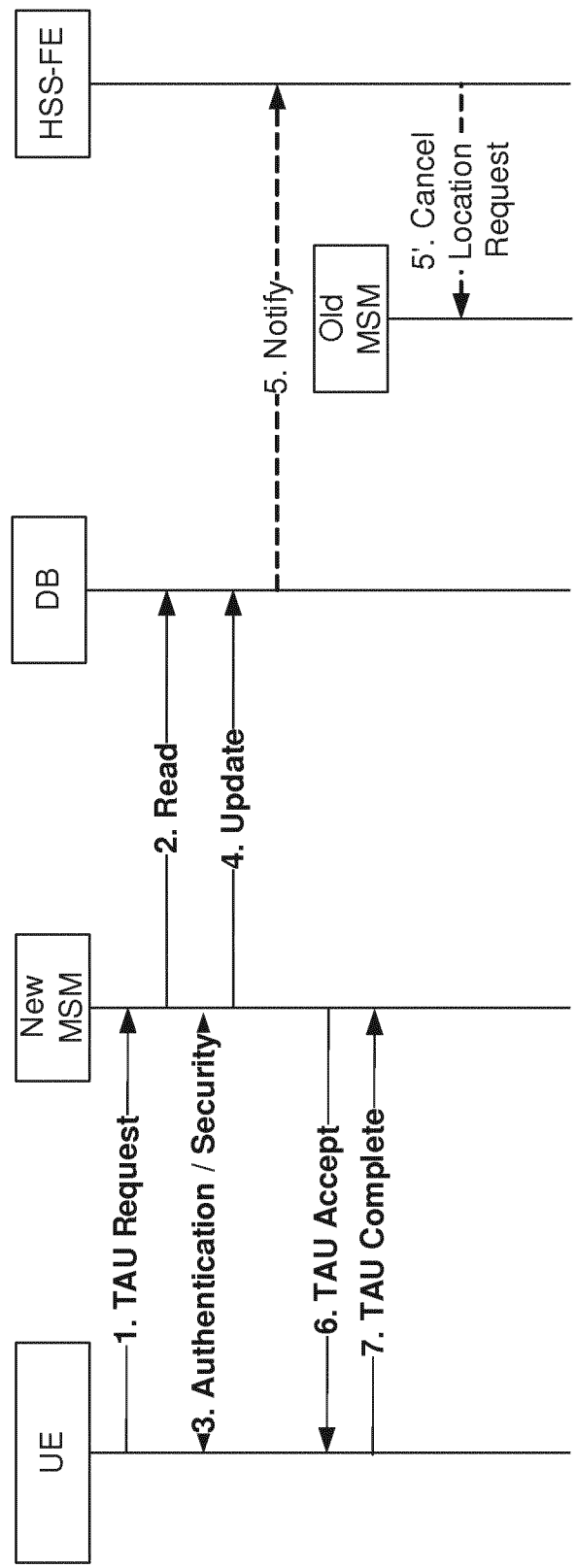
FIG. 11 illustrates a signaling diagram depicting TAU scenario, with Data Sharing between the MSM entity and the HSS, according to an embodiment.

FIG. 11 illustrates a signaling diagram depicting TAU scenario, with Data Sharing between the MSM entity and the HSS, according to an embodiment. In this example, the new MSM, old MSM and HSS may access the same DB (i.e., only applies to non-roaming scenarios). All the MSM signaling to the HSS can be skipped. If the UE was registered in a different SDL or in a FPLMN, a notification may be sent to trigger the Cancel Location Request towards the old MSM.

Some benefits of SDL between MSM and HSS, as depicted in FIG. 11, may include: no signaling to HSS (neither for authentication nor for ULR/download of subscription data). More generally, sharing the Data between the MSM and the HSS (in non-roaming scenarios) allows for removal of all the intra PLMN signaling between the MSM entities and the HSS, in all signaling scenarios between the MME and HSS (e.g. in all legacy Sha authentication, purge, reset, user profile updates etc). In these scenarios, the MSM and the SDL interact directly with each other, bypassing the HSS-FE. This implies the support of some HSS/Auc application logic by the MSM (or the co-location of an HSS-FE instance with the MSM).

According to certain embodiments, the Database (SDL) can be accessed by different nodes, such as a provisioning FE, HSS-FE, or MSM. The access procedures may include create, read, update, delete operations and subscription to notification upon data change.

Figure 12:
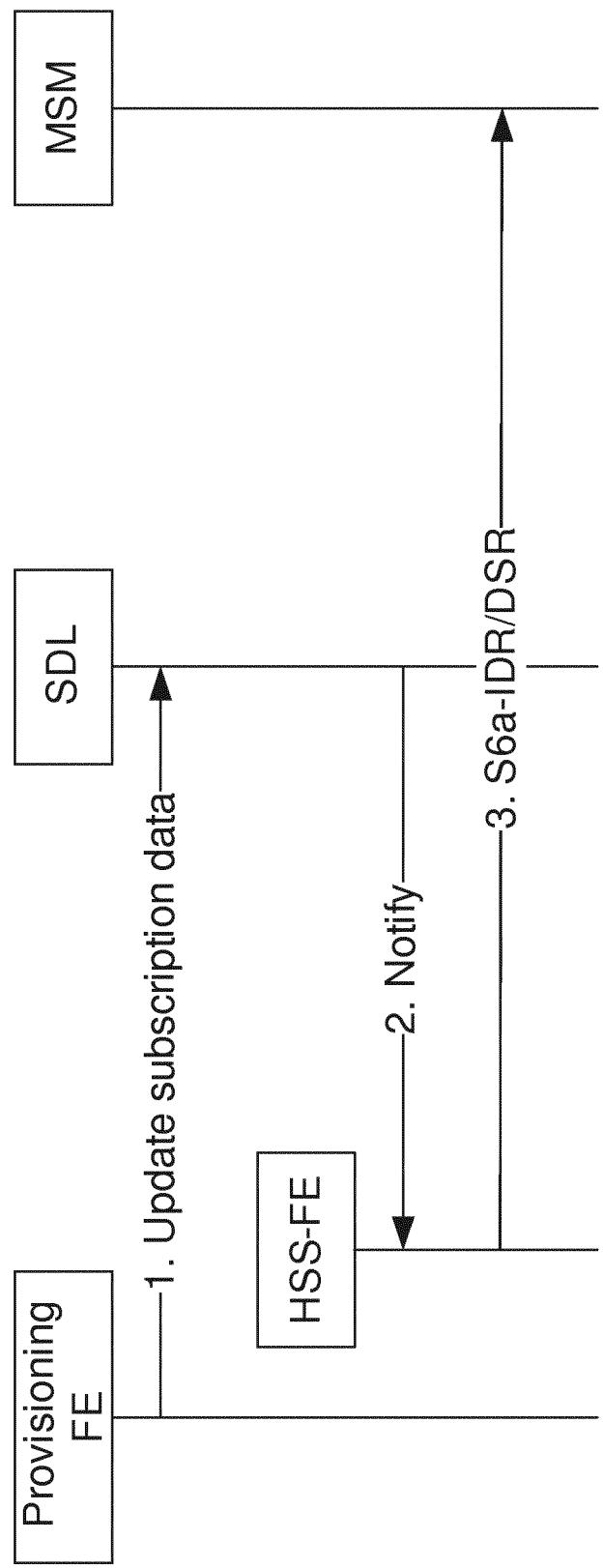
FIG. 12 illustrates a signaling diagram depicting an outbound roaming case, according to one embodiment.

FIG. 12 illustrates a signaling diagram depicting an outbound roaming case, according to one embodiment. As illustrated in FIG. 12, at 1, the User Profile stored in the SDL is updated by the Provisioning FE. At 2, the SDL informs a suitable HSS-FE about the profile update (assuming that a subscription to notification exists). If, in addition a subscription to notification from any node exists and the notification condition is met, this node is also notified (not shown in the flow). At 3, the HSS-FE informs the serving MSM.

Figure 13:
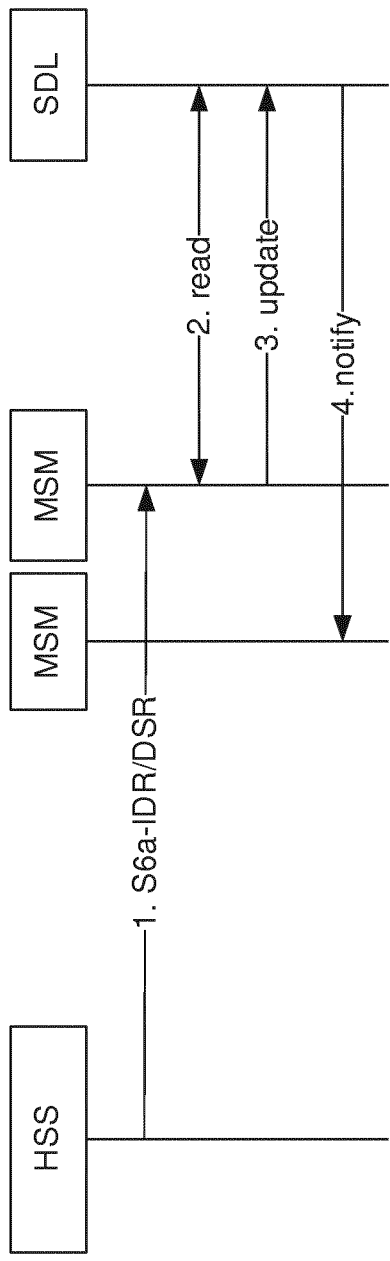
FIG. 13 illustrates a signaling diagram depicting an inbound roaming case, according to an embodiment.

FIG. 13 illustrates a signaling diagram depicting an inbound roaming case, according to an embodiment. As illustrated in FIG. 13, at 1, the MSM receives information about the modified User Profile. At 2, the MSM reads (old) User Profile from SD and, at 3, the MSM updates the SDL with the modified User Profile. At 4, if a specific MSM instance is currently serving the user, this MSM instance is notified (in order to take immediate action) assuming that a subscription to notification exists. Otherwise, the MSM sending the update to the SDL performs any action needed resulting from the data update.

Figure 14:
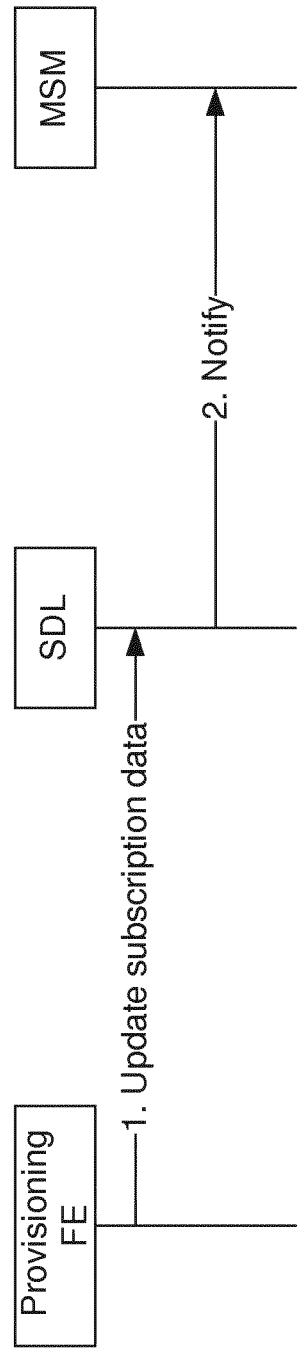
FIG. 14 illustrates a signaling diagram depicting a non-roaming case, according to an embodiment.

FIG. 14 illustrates a signaling diagram depicting a non-roaming case, according to an embodiment. As illustrated in FIG. 14, at 1, the User Profile stored in the SDL is updated by the Provisioning front end (FE). At 2, if a specific MSM instance is currently serving the user, this MSM instance is notified (in order to take immediate action), assuming that a subscription to notification exists. Otherwise a suitable MSM instance is selected and notified to perform any action needed resulting from the data update (assuming that a subscription to notification exists).

Figure 15:
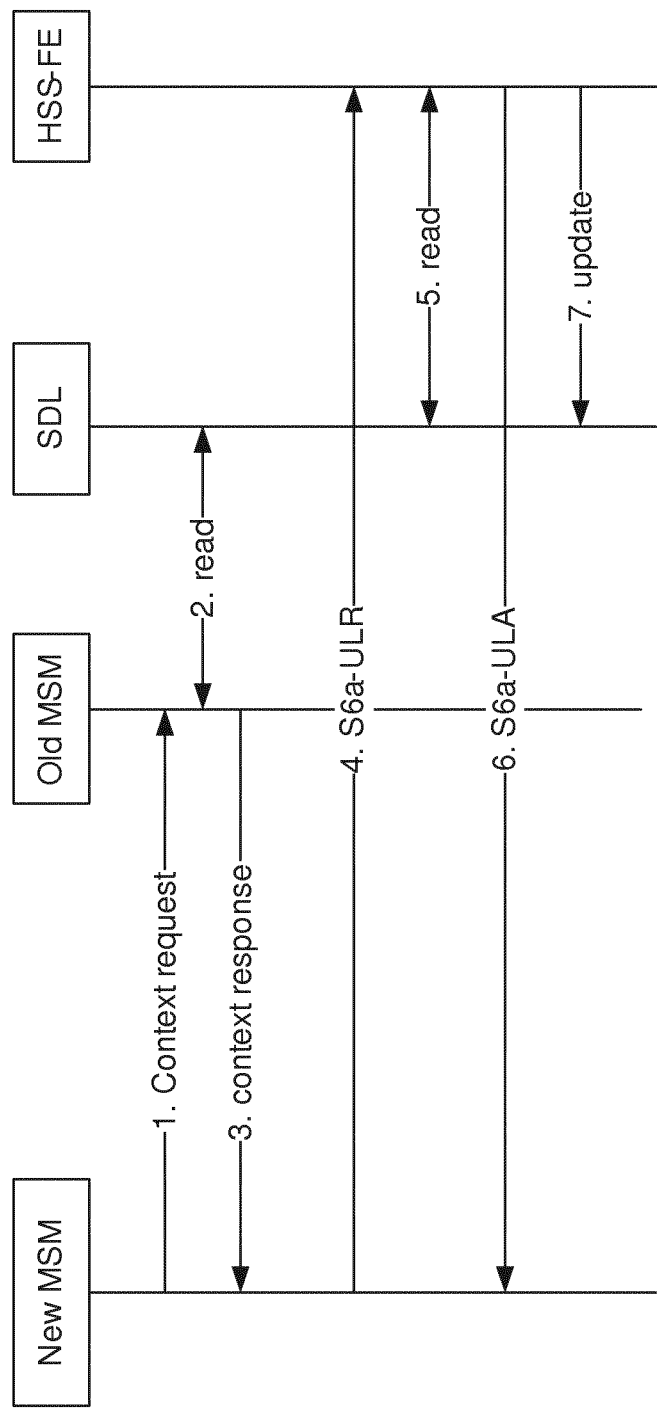
FIG. 15 illustrates a signaling diagram depicting an own subscriber roaming out scenario, according to an embodiment.

FIG. 15 illustrates a signaling diagram depicting an own subscriber roaming out scenario, according to an embodiment. As illustrated in FIG. 15, at 7, all MSM-state information is deleted from the SDL, and there is no need to send a Cancel Location.

Figure 16:
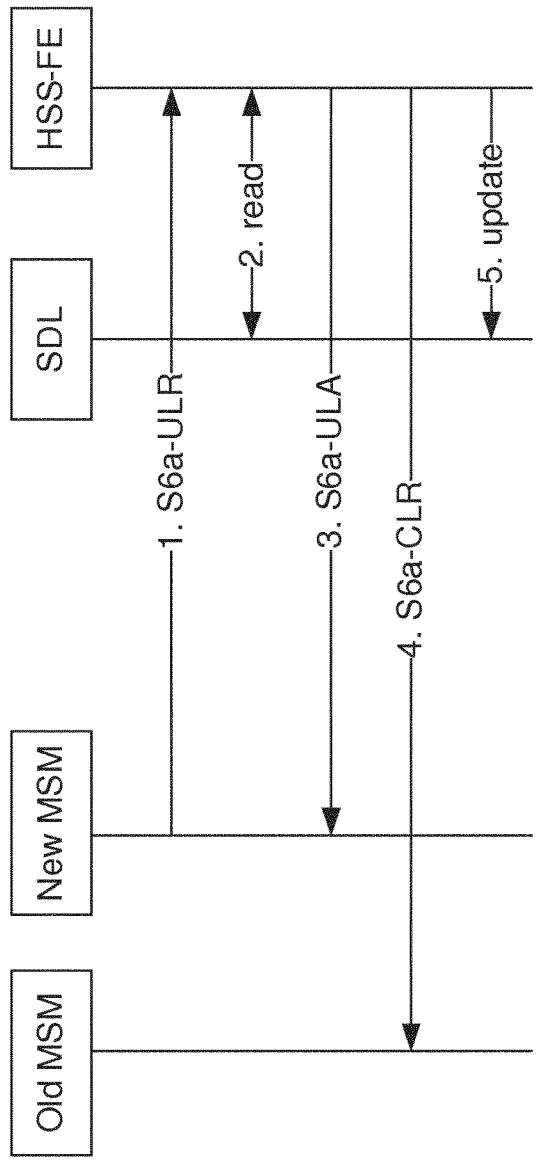
FIG. 16 illustrates a signaling diagram depicting an own subscriber staying out scenario, according to an embodiment.

FIG. 16 illustrates a signaling diagram depicting an own subscriber staying out scenario, according to an embodiment. According to the example of FIG. 16, assuming that old and new MSM in visited PLMN(s) do not share data, otherwise there is no signaling at all.

Figure 17:
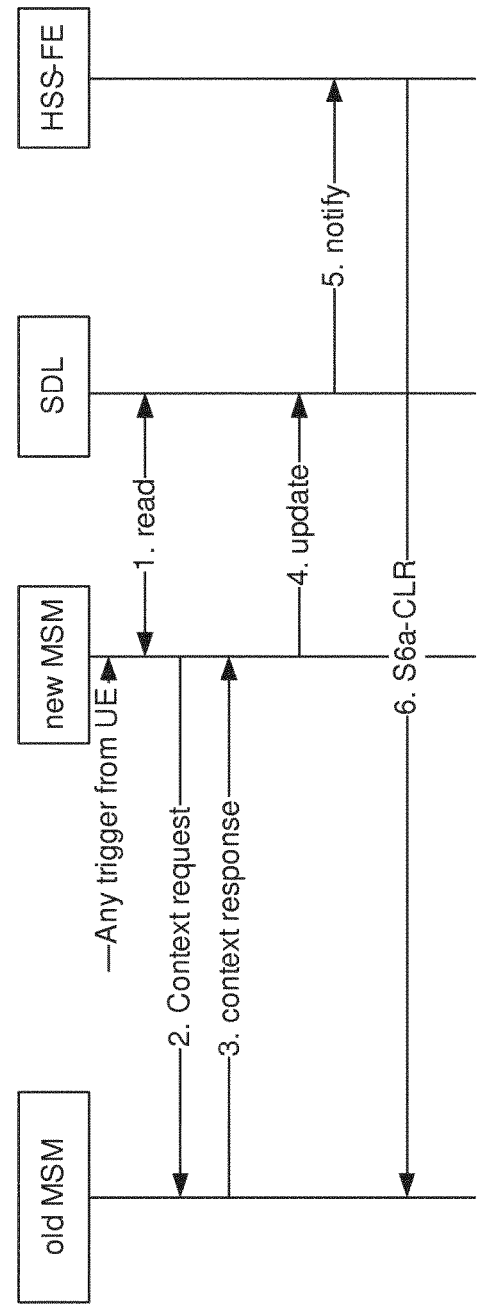
FIG. 17 illustrates a signaling diagram depicting an own subscriber roaming in scenario, according to an embodiment.

FIG. 17 illustrates a signaling diagram depicting an own subscriber roaming in scenario, according to an embodiment. As illustrated in FIG. 17, at 4, the new MSM updates the SDL (old MSM no longer serving the subscriber). At 5, triggered by the update of the serving node, a suitable HSS-FE is notified (assuming that a subscription to notification exists).

Figure 18:
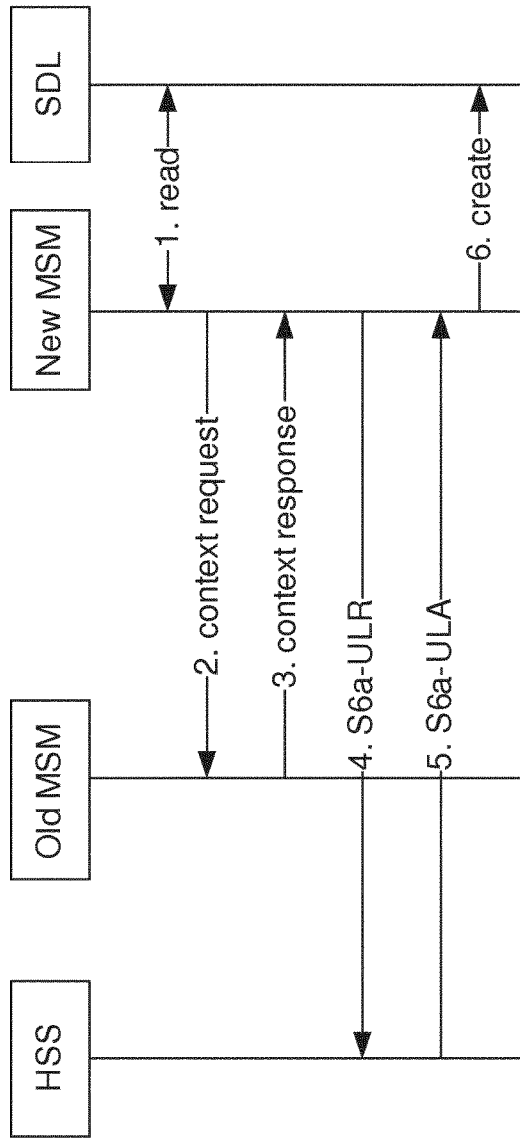
FIG. 18 illustrates a signaling diagram depicting a foreign subscriber roaming in scenario, according to an embodiment.

FIG. 18 illustrates a signaling diagram depicting a foreign subscriber roaming in scenario, according to an embodiment. As illustrated in FIG. 18, at 1, the new MSM reads SDL and detects that the foreign subscriber is not yet known in the DB. At 6, the new MSM creates a new entry for the foreign subscriber in the SDL.

Figure 19:
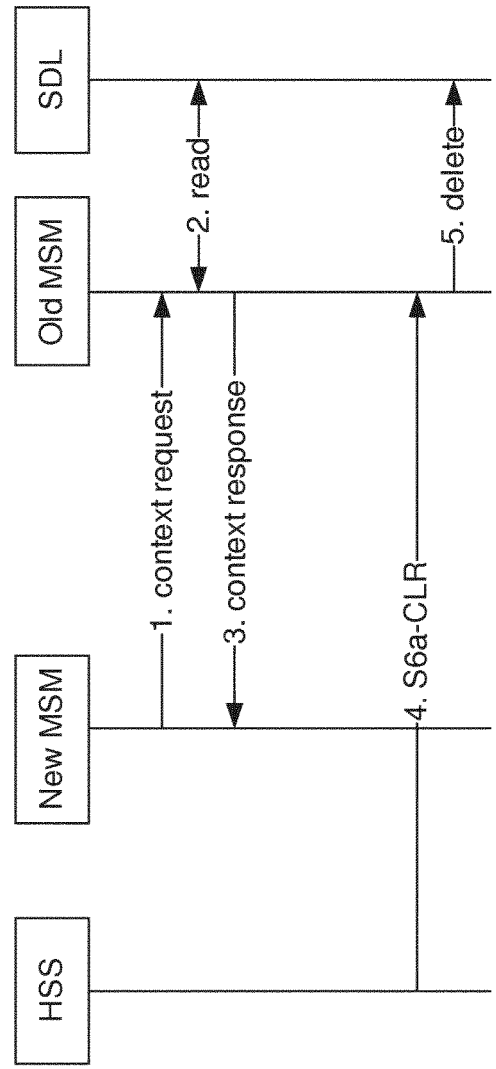
FIG. 19 illustrates a signaling diagram depicting a foreign subscriber roaming out scenario, according to an embodiment.

FIG. 19 illustrates a signaling diagram depicting a foreign subscriber roaming out scenario, according to an embodiment. As illustrated in FIG. 19, steps 1-3 and steps 4-5 may be handled by different MSM instances. It is noted that interworking in foreign network between HSS and New MSM is not shown in FIG. 19.

Figure 20:
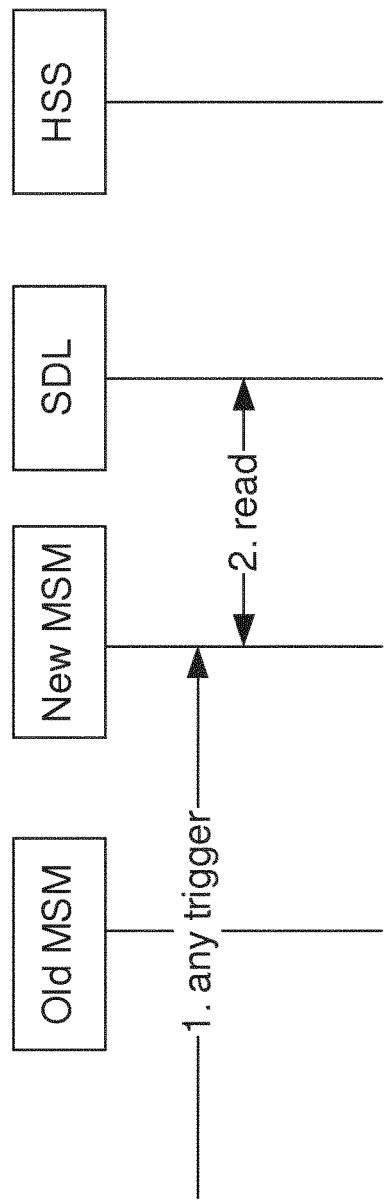
FIG. 20 illustrates a signaling diagram depicting a foreign or own subscriber staying in, according to an embodiment.

FIG. 20 illustrates a signaling diagram depicting a foreign or own subscriber staying in, according to an embodiment. As illustrated in FIG. 20, moving from old MSM instance to new MSM instance within the PLMN does not have any impacts other than reading the SDL by the New MSM.

Figure 21:
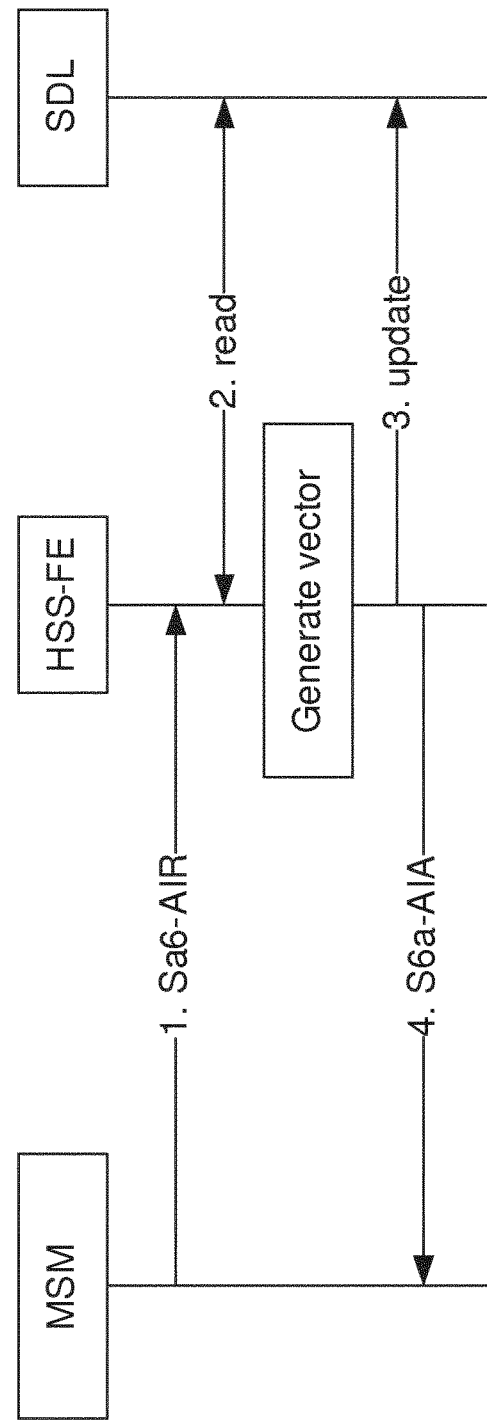
FIG. 21 illustrates a signaling diagram depicting an outbound roaming case, according to one embodiment.
Figure 22:
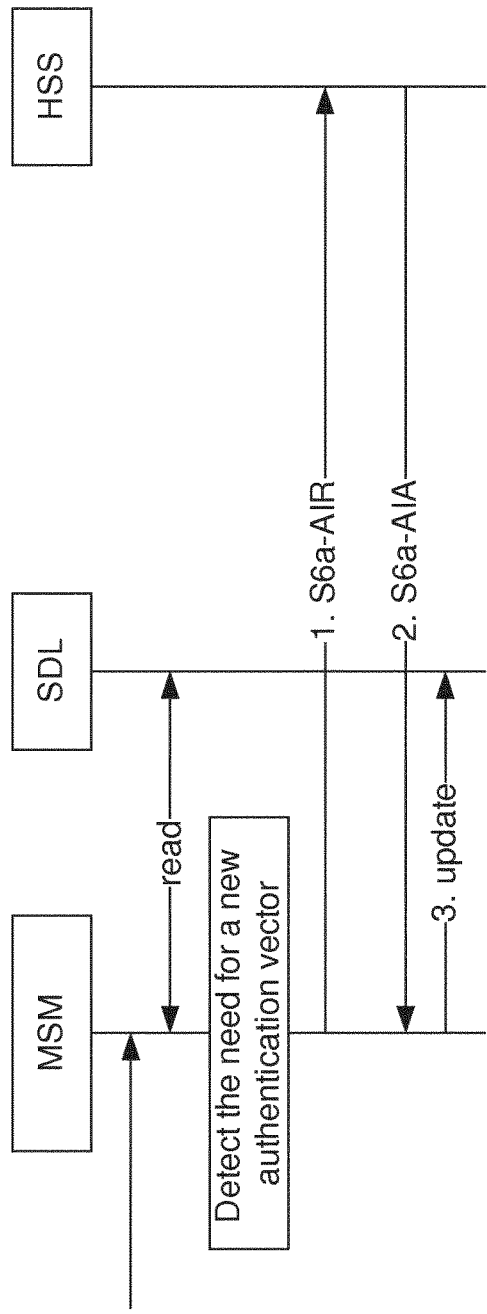
FIG. 22 illustrates a signaling diagram depicting an inbound roaming case, according to one embodiment.
Figure 23:
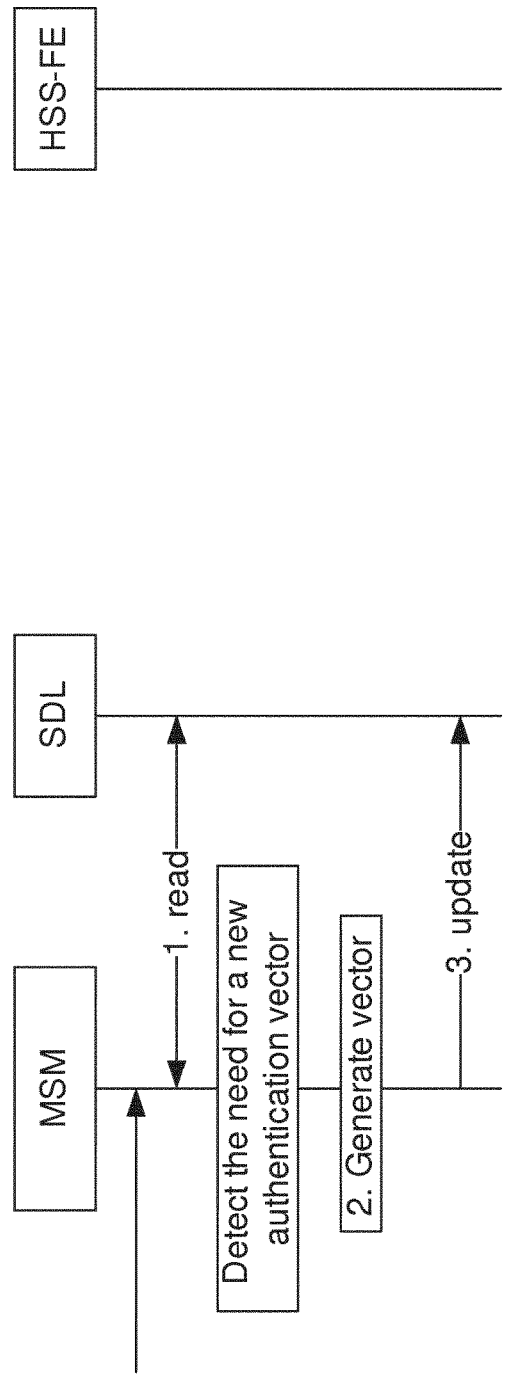
FIG. 23 illustrates a signaling diagram depicting a non-roaming case, according to one embodiment.

FIGS. 21-23 illustrate examples of authentication approaches, according to certain embodiments. For example, FIG. 21 illustrates a signaling diagram depicting an outbound roaming case, according to one embodiment. As illustrated in FIG. 21, at 1, the HSS-FE receives a request for a new authentication vector. At 2, the HSS-FE reads the SDL and generates a new vector. At 3, the HSS-FE updates the SDL (e.g., with new sequence number) and, at 4, the HSS-FE sends new vector to the MSM.

FIG. 22 illustrates a signaling diagram depicting an inbound roaming case, according to one embodiment. As illustrated in FIG. 22, at 1, triggered by any request—after reading the SDL (which includes reading the HSS address)—the MSM may detect the need for a new authentication vector and sends Sha-AIR to the HSS. At 2, the MSM receives the requested authentication vector and, at 3, the MSM continues processing the original request and updates the SDL.

FIG. 23 illustrates a signaling diagram depicting a non-roaming case, according to one embodiment. As illustrated in FIG. 23, at 1, triggered by any request—after reading the SDL (which includes reading the encrypted secret Key)—the MSM may detect the need for a new authentication vector. At 2, the MSM generates a new vector (this is new functionality for serving nodes) and, at 3, the MSM continues processing the original request and updates the SDL. It is noted that, as an implementation option, the MSM may have an integrated/co-located HSS-FE that performs vector generation after being triggered on the internal interface. This may include an additional read/update access from the integrated HSS-FE to the SDL.

Figure 24:
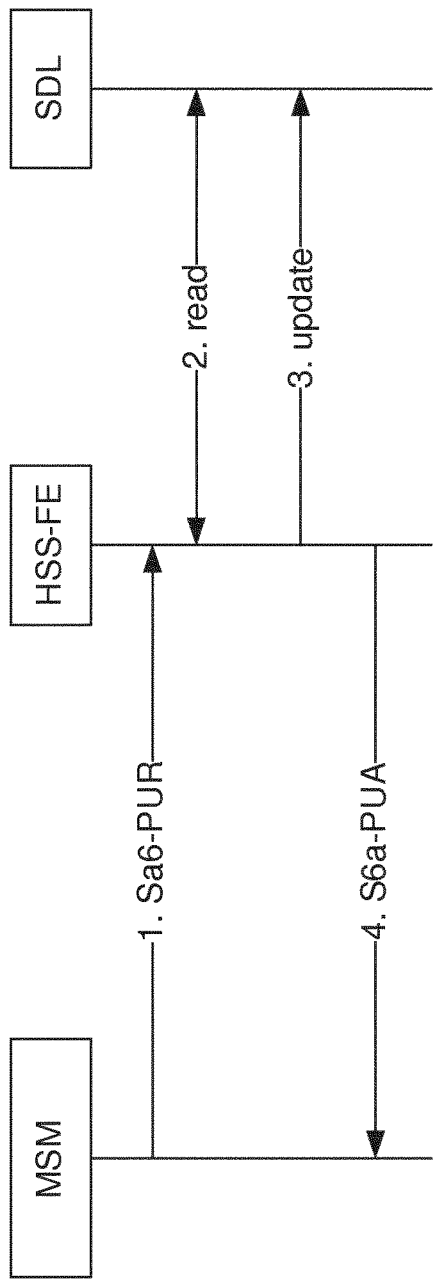
FIG. 24 illustrates a signaling diagram of an outbound roaming case, according to one embodiment.
Figure 25:
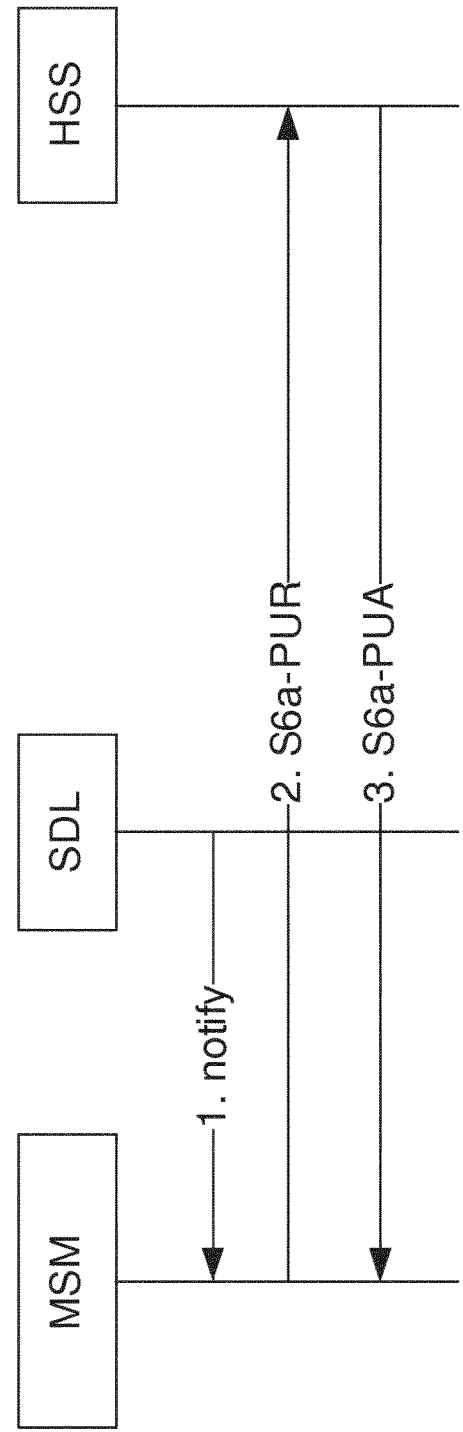
FIG. 25 illustrates a signaling diagram of an inbound roaming case, according to one embodiment.
Figure 26:
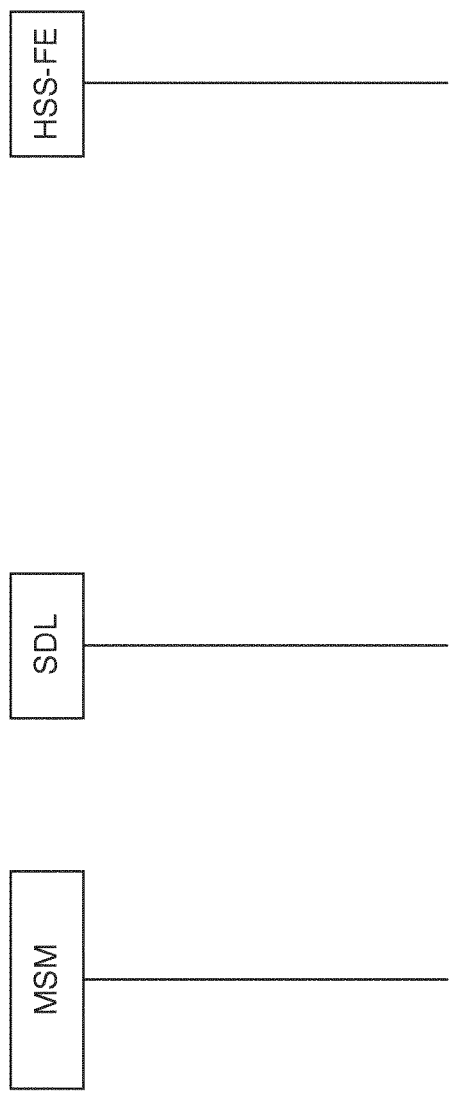
FIG. 26 illustrates a signaling diagram of a non-roaming case in which there is no signaling necessary, according to an embodiment.

FIGS. 24-26 illustrate examples of purging approaches, according to certain embodiments. FIG. 24 illustrates a signaling diagram of an outbound roaming case, and FIG. 25 illustrates a signaling diagram of an inbound roaming case, according to some embodiments. As illustrated in FIG. 25, at 1, SDL notifies a suitable MSM instance about the deletion of a foreign subscriber's data (complete dataset including permanent subscription data). At 2, MSM sends S6a-PUR and, at 3, MSM receives S6a-PUA.

FIG. 26 illustrates a signaling diagram of a non-roaming case in which there is no signaling necessary, according to certain embodiments. In this example, the SDL may want to purge an own subscriber's temporary state information while no specific MSM instance is serving the UE.

Figure 27:
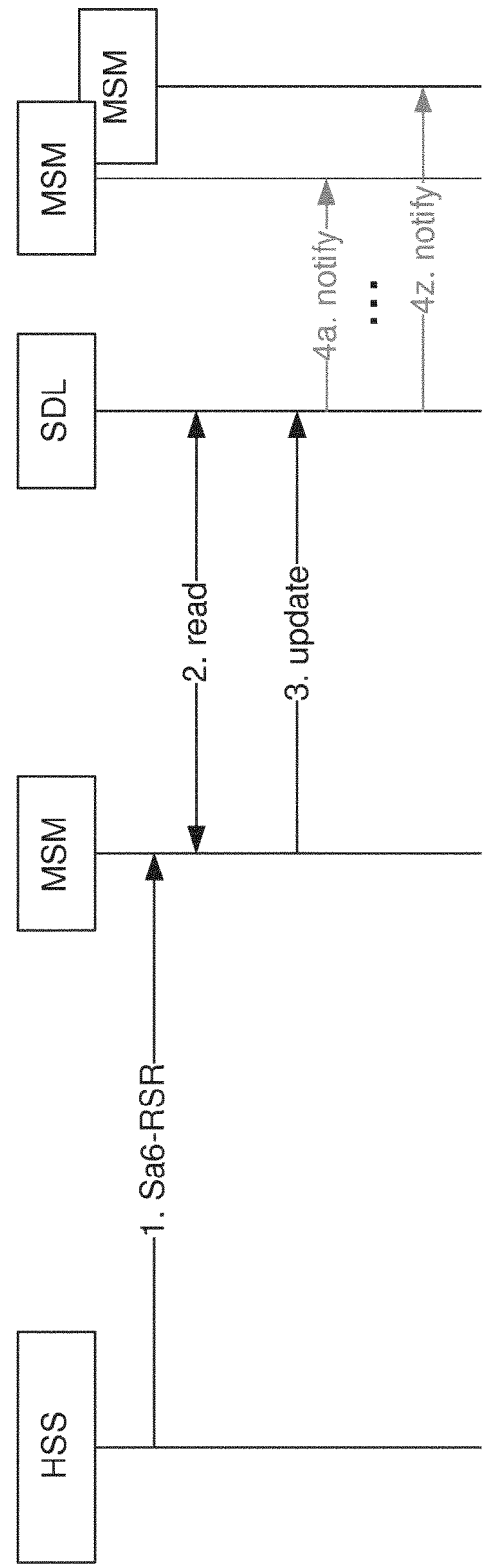
FIG. 27 illustrates a signaling diagram depicting a receiving case, according to one embodiment.
Figure 28:
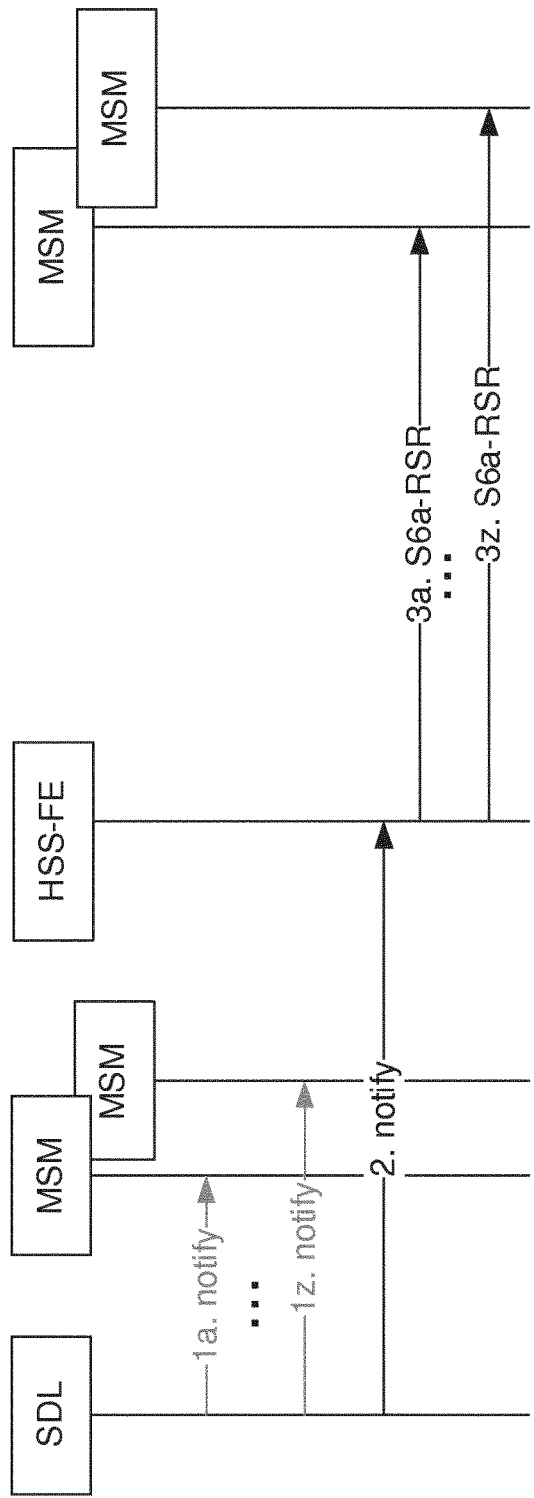
FIG. 28 illustrates a signaling diagram depicting a sending case, according to one embodiment.

FIGS. 27 and 28 illustrate examples of approaches for reset, according to certain embodiments. FIG. 27 illustrates a signaling diagram depicting a receiving case, according to one embodiment. As illustrated in FIG. 27, at 1, MSM receives Reset from foreign HSS. At 2, MSM reads from SDL the list of potentially impacted inbound roamers. At 3, MSM updates SDL (mark impacted subscriber as not confirmed). At 4, if an impacted subscriber is currently served by a specific MSM instance, this MSM is notified to take immediate action.

FIG. 28 illustrates a signaling diagram depicting a sending case, according to one embodiment. As illustrated in FIG. 28, at 1, if an impacted subscriber is currently served by a specific MSM instance, this MSM instance is notified to take immediate action. At 2, a suitable HSS-FE is notified and, at 3, the HSS-FE sends reset messages to all external MSMs that currently serve an impacted subscriber.

Figure 29:
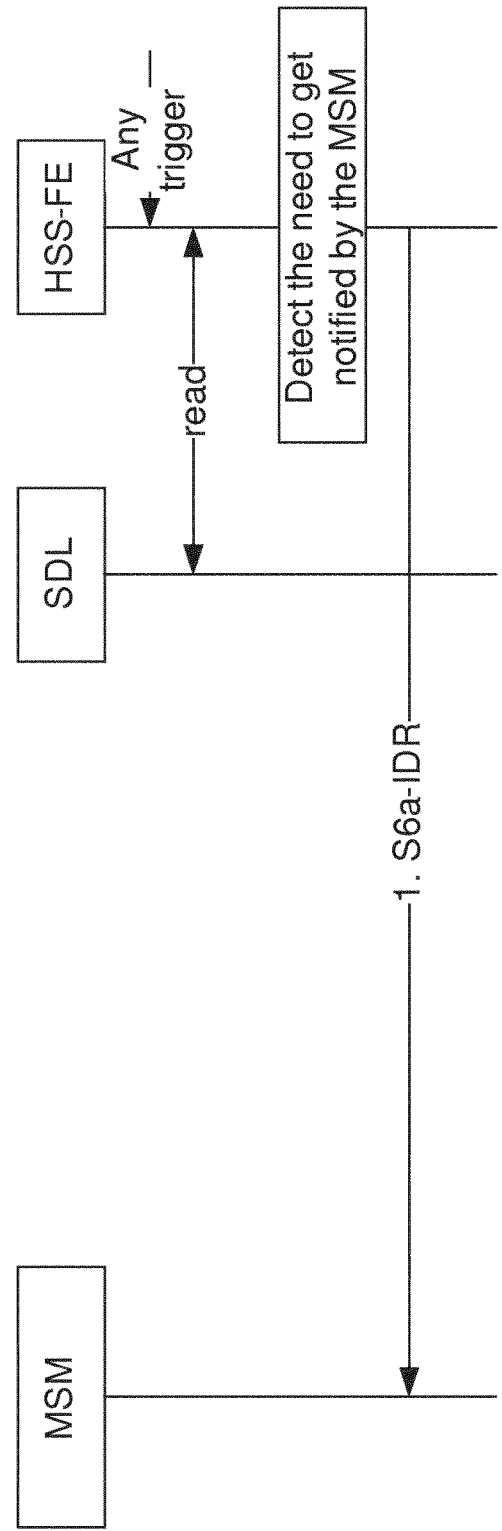
FIG. 29 illustrates a signaling diagram depicting an outbound roaming case, according to one embodiment.
Figure 30:
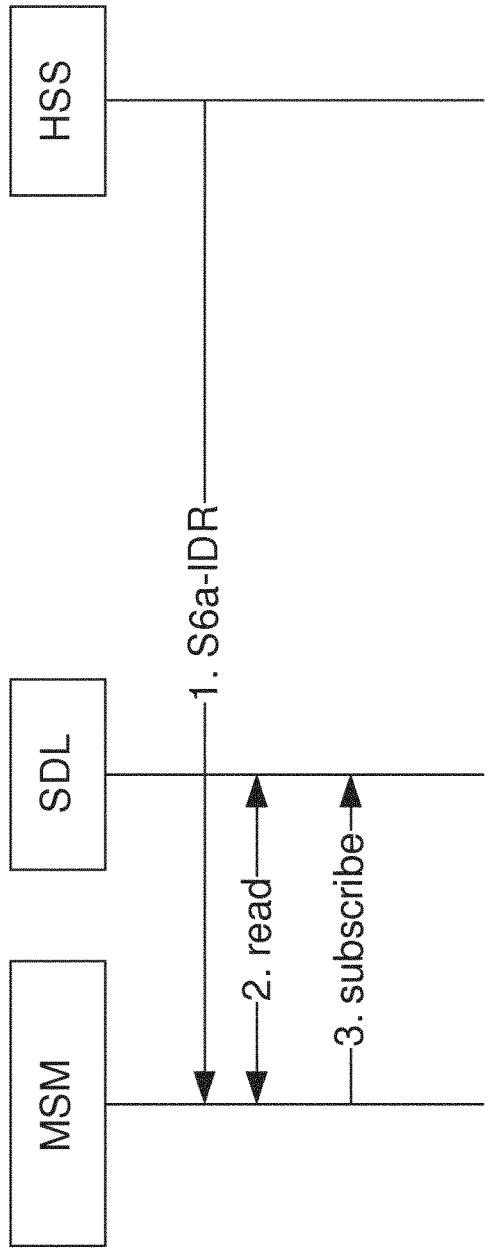
FIG. 30 illustrates a signaling diagram depicting an outbound roaming case, according to one embodiment.
Figure 31:
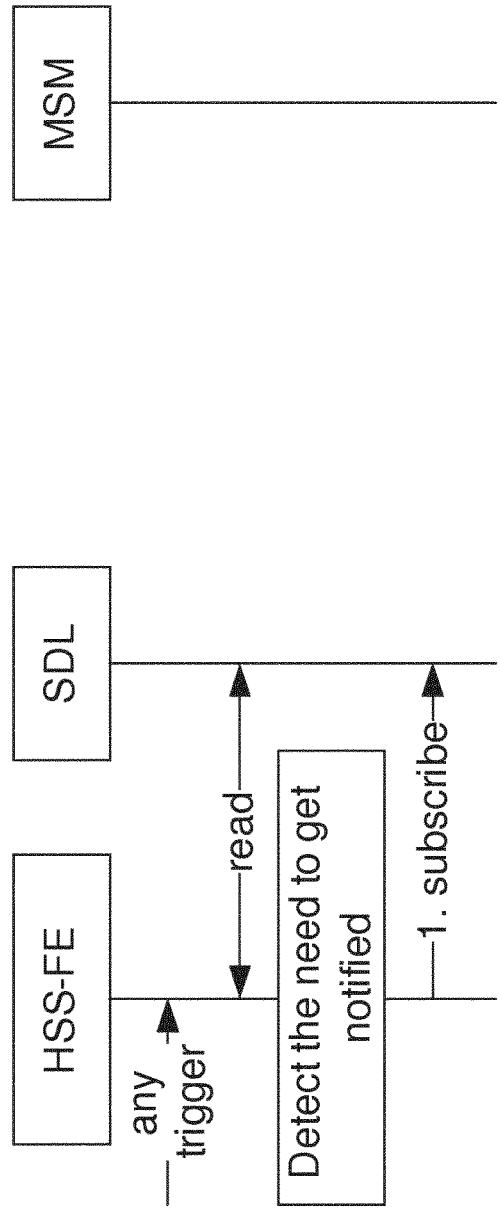
FIG. 31 illustrates a signaling diagram depicting a non-roaming case, according to one embodiment.

FIGS. 29-31 illustrate examples of subscription to notification approaches, according to certain embodiments. FIG. 29 illustrates a signaling diagram depicting an outbound roaming case, according to one embodiment. As illustrated in FIG. 29, when the HSS-FE detects the need to get notified as soon as an outbound roamer becomes reachable it sends Sha-IDR to the external MSM.

FIG. 30 illustrates a signaling diagram depicting an outbound roaming case, according to one embodiment. As illustrated in FIG. 30, at 1, the MSM receives the request to notify the HSS as soon as the inbound roamer becomes reachable. At 2, the MSM reads the SDL and, at 3, the MSM subscribes to notification.

FIG. 31 illustrates a signaling diagram depicting a non-roaming case, according to one embodiment. As illustrated in FIG. 31, when the HSS-FE detects the need to get notified as soon as a non-roaming subscriber becomes reachable, it subscribes to notification.

Figure 32:
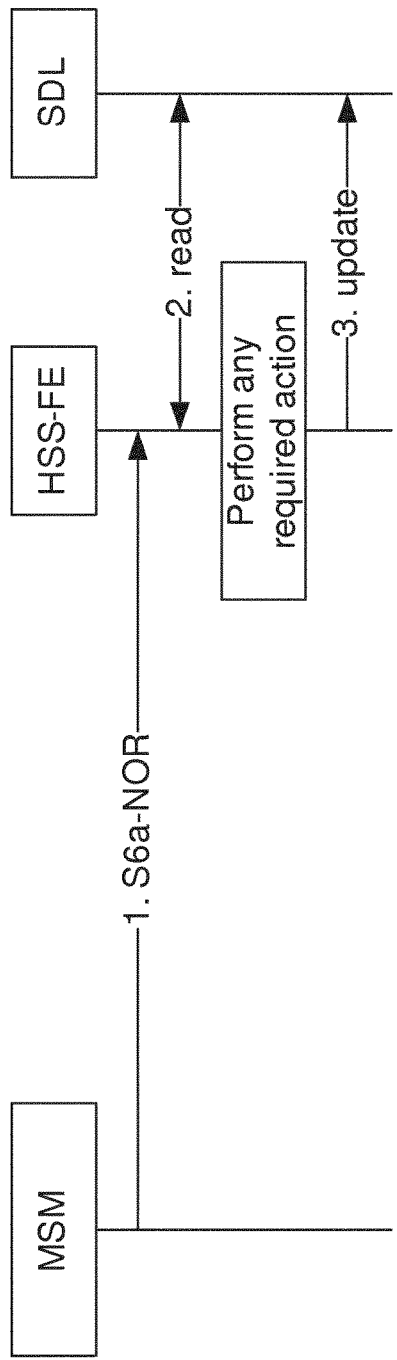
FIG. 32 illustrates a signaling diagram depicting an outbound roaming case, according to one embodiment.
Figure 33:
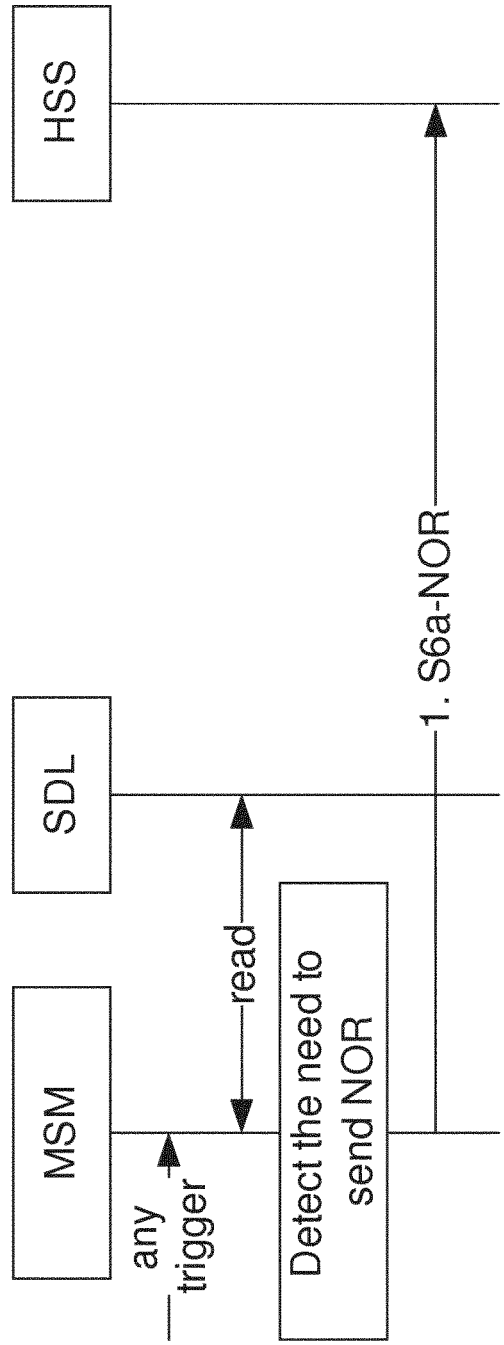
FIG. 33 illustrates a signaling diagram depicting an inbound roaming case, according to one embodiment.
Figure 34:
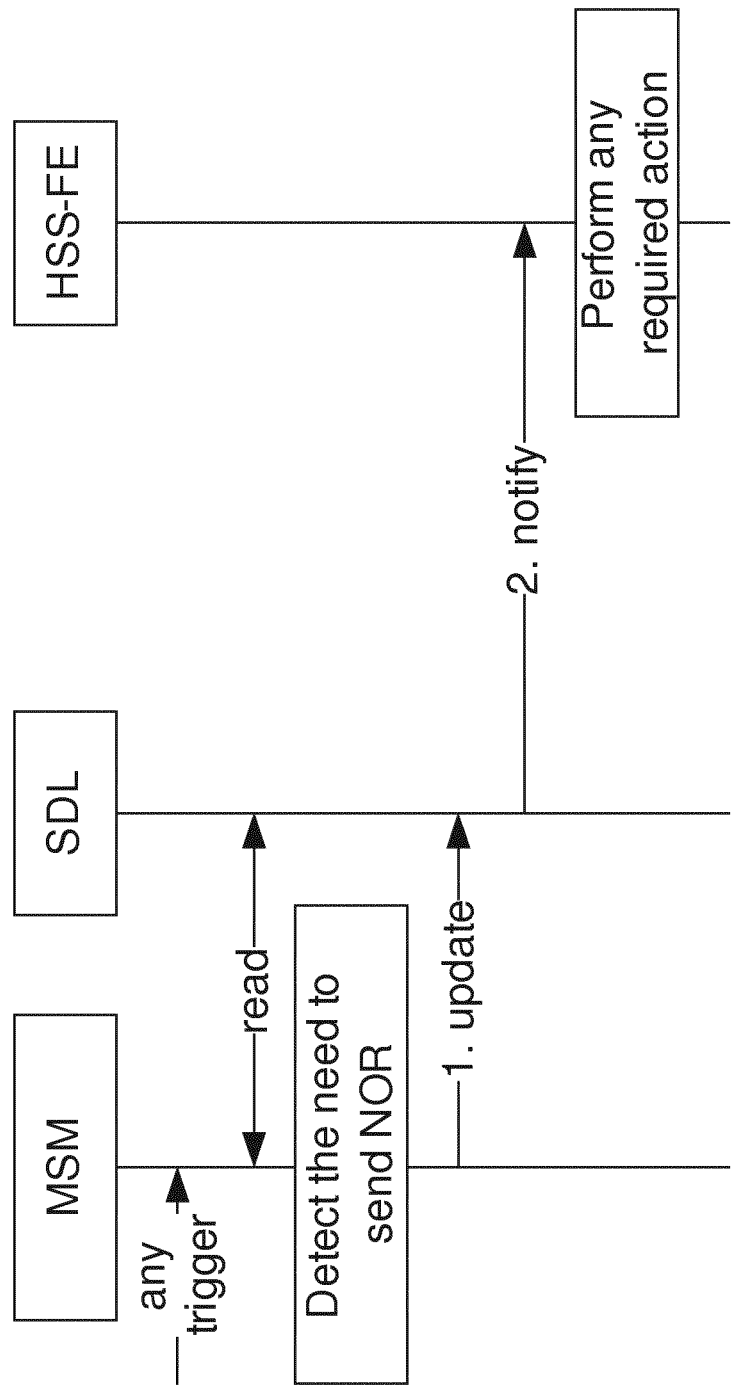
FIG. 34 illustrates a signaling diagram depicting a non-roaming case, according to one embodiment.

FIGS. 32-34 illustrate examples of notification approaches, according to certain embodiments. FIG. 32 illustrates a signaling diagram depicting an outbound roaming case, according to one embodiment. FIG. 33 illustrates a signaling diagram depicting an inbound roaming case, according to one embodiment. As illustrated in FIG. 33, at 1, when the MSM detects the need to send NOR for an inbound roamer, it sends Sha-NOR to the external HSS. FIG. 34 illustrates a signaling diagram depicting a non-roaming case, according to one embodiment. As illustrated in FIG. 34, at 1, when the MSM detects the need to send NOR for a non-roaming subscriber, it just updates the SDL (assuming that the HSS-FE has subscribed to be notified). At 2, SDL notifies a suitable HSS-FE which performs any required action.

Figure 35A:
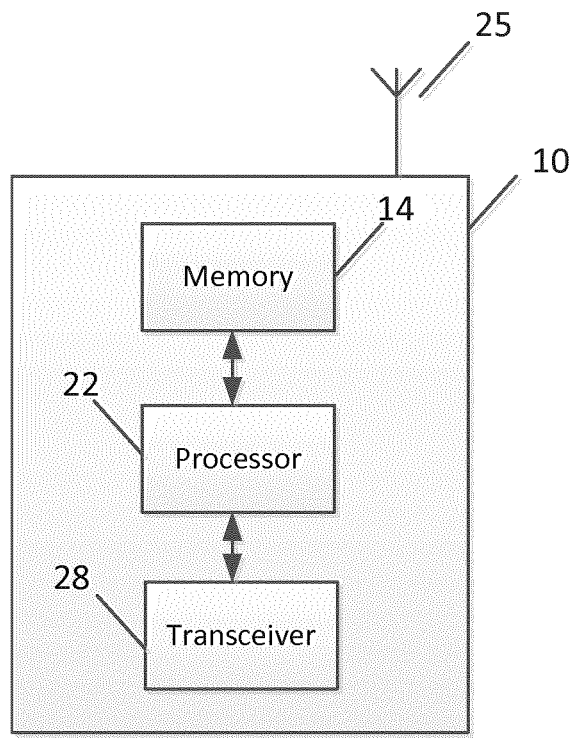
FIG. 35a illustrates a block diagram of an apparatus, according to one embodiment.

FIG. 35a illustrates an example of an apparatus 10 according to an embodiment. In an embodiment, apparatus 10 may be a node, host, or server in a communications network or serving such a network. For example, apparatus 10 may be a network node, access node, or network entity in a radio access network. For example, apparatus 10 may be a MSM, MME, HSS, SCEF, GW, VNF, and/or any Core Control Function of 5G radio access technology. It should be noted that one of ordinary skill in the art would understand that apparatus 10 may include components or features not shown in FIG. 35a.

As illustrated in FIG. 35a, apparatus 10 may include a processor 22 for processing information and executing instructions or operations. Processor 22 may be any type of general or specific purpose processor. While a single processor 22 is shown in FIG. 35a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of LTE, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or entity, such as a MSM, MME, HSS, SCEF, GW, VNF, and/or an access node of 5G radio access technology, for example. According to one embodiment, apparatus 10 may be controlled by memory 14 and processor 22 to perform the functions associated with embodiments described herein, such as those illustrated in FIGS. 1-34.

Figure 35B:
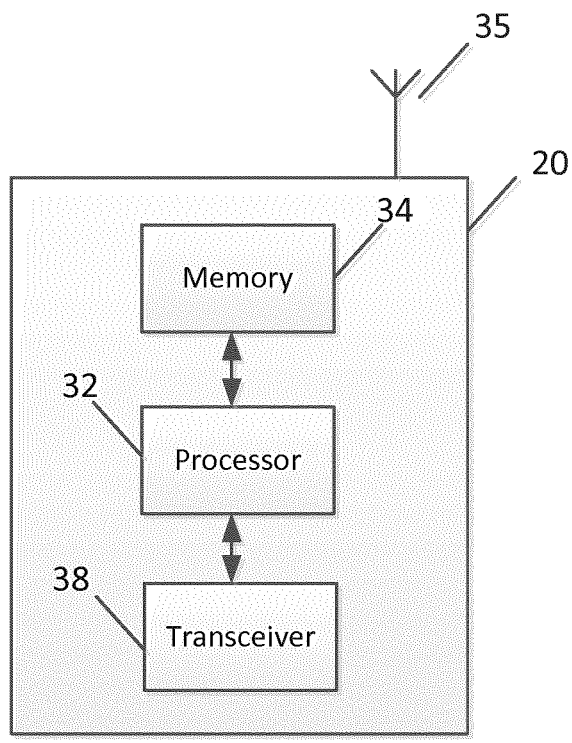
FIG. 35b illustrates a block diagram of an apparatus, according to another embodiment.

FIG. 35*b* illustrates an example of an apparatus 20 according to another embodiment. In an embodiment, apparatus 20 may be a node or element in a communications network or associated with such a network, such as a UE, mobile device, stationary device, or other device. A UE may be often referred to as, for example, mobile stations, mobile units, subscriber stations, wireless terminals, tablets, smart phones, devices, or the like. Apparatus 10 may be implemented as, for example, a wireless handheld device, a wireless plug-in accessory, or the like. In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be UE configured to operate using one or more radio access technologies, such as LTE, LTE-A, 5G, WLAN, WiFi, Bluetooth, NFC, and any other radio access technologies. Moreover, apparatus 20 may be configured to have established connections to access points using a plurality of the radio access technologies. It should be noted that one of ordinary skill in the art would understand that apparatus 20 may include components or features not shown in FIG. 35*b*.

As illustrated in FIG. 35*b*, apparatus 20 may include a processor 32 for processing information and executing instructions or operations. Processor 32 may be any type of general or specific purpose processor. While a single processor 32 is shown in FIG. 35*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for receiving a downlink or signal and for transmitting via an uplink from apparatus 20. Apparatus 20 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly. Apparatus 20 may further include a user interface.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a UE, for example. In this embodiment, apparatus 20 may be controlled by memory 34 and processor 32 to perform the functions associated with embodiments described herein, such as those illustrated in FIGS. 1-34.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   the at least one memory and the computer program code configured, with the at least one processor, to cause the apparatus at least to
   store data in at least one database of a shared data layer, wherein the data stored in the shared data layer is shared by a plurality of network entities, wherein the data comprises at least one of user subscription data or session data;
   download by a mobility management entity of a visited public land mobile network, the user subscription data from a home subscription server;
   store the downloaded user subscription data in the shared data layer of the visited public land mobile network;
   check whether the user subscription data or session data is available in the shared data layer of the visited public land mobile network;
   when the session data is available in the shared data layer of the visited public land mobile network, skip part of or all intra or inter-public land mobile network signaling between the network entities; and
   when the user subscription data is available in the shared data layer of the visited public land mobile network, skip part of or all intra or inter-public land mobile network signaling comprising an update location request associated with a non-network sharing user equipment between the network entities and the home subscription server.

2. The apparatus according to claim 1, wherein the network entities comprise one or more mobility management entities, mobility and session management entities, service capability exposure functions, or gateways.

3. The apparatus according to claim 1, wherein the user subscription data stored in the shared data layer is shared with other entities in the visited public land mobile network.

4. The apparatus according to claim 3, wherein the user subscription data is shared with the other entities in the visited public land mobile network when a user equipment moves under a control of a new mobility management entity.

5. The apparatus according to claim 1, wherein the downloading is performed by a mobility management entity of a visited public land mobile network.

6. A method, comprising:
   storing data in at least one database of a shared data layer, wherein the data stored in the shared data layer is shared by a plurality of network entities, wherein the data comprises at least one of user subscription data or session data;
   downloading by a mobility management entity of a visited public land mobile network, the user subscription data from a home subscription server;
   storing the downloaded user subscription data in the shared data layer of the visited public land mobile network;
   checking whether the user subscription data or session data is available in the shared data layer of the visited public land mobile network;
   when the session data is available in the shared data layer of the visited public land mobile network, skipping part of or all intra or inter-public land mobile network signaling between the network entities; and
   when the user subscription data is available in the shared data layer of the visited public land mobile network, skipping part of or all intra or inter-public land mobile network signaling comprising an update location request associated with a non-network sharing user equipment between the network entities and the home subscription server.

7. The method according to claim 6, wherein the network entities comprise one or more mobility management entities, mobility and session management entities, service capability exposure functions, or gateways.

8. The method according to claim 6, wherein the user subscription data stored in the shared data layer is shared with other entities in the visited public land mobile network.

9. The method according to claim 8, wherein the user subscription data is shared with the other entities in the visited public land mobile network when a user equipment moves under a control of a new mobility management entity.

10. A computer program embodied on a non-transitory computer readable medium, wherein the computer program is configured to control a processor to perform a process according to claim 6.

\* \* \* \* \*